(12) United States Patent
Anderson

(10) Patent No.: US 12,524,939 B1
(45) Date of Patent: Jan. 13, 2026

(54) SYSTEM AND METHOD OF REGISTERING WIRELESS TRACKING DEVICES INTO A PRIVATE NETWORK VISUAL AUGMENTED REALITY VIEW

(71) Applicant: Gregory David Anderson, Coral Gables, FL (US)

(72) Inventor: Gregory David Anderson, Coral Gables, FL (US)

(73) Assignee: LOK8R LLC, Coral Gables, FL (US)

(*) Notice: Subject to any disclaimer, the term of this patent is extended or adjusted under 35 U.S.C. 154(b) by 225 days.

(21) Appl. No.: 18/458,427

(22) Filed: Aug. 30, 2023

Related U.S. Application Data

(60) Provisional application No. 63/442,588, filed on Feb. 1, 2023, provisional application No. 63/403,641, filed on Sep. 2, 2022.

(51) Int. Cl.
| | |
|---|---|
| *G06T 11/60* | (2006.01) |
| *G06T 3/40* | (2024.01) |
| *G06T 11/00* | (2006.01) |
| *H04L 65/1073* | (2022.01) |
| *H04W 4/029* | (2018.01) |

(52) U.S. Cl.
CPC .............. *G06T 11/60* (2013.01); *G06T 3/40* (2013.01); *G06T 11/001* (2013.01); *H04L 65/1073* (2013.01); *H04W 4/029* (2018.02)

(58) Field of Classification Search
CPC ......... G06T 11/60; G06T 3/40; G06T 11/001; G06T 19/006; G06T 11/00; H04L 65/1073; H04W 4/029; G06F 3/011
See application file for complete search history.

(56) References Cited

U.S. PATENT DOCUMENTS

| | | | |
|---|---|---|---|
| 5,815,411 A | 9/1998 | Ellenby et al. | |
| 7,138,963 B2 | 11/2006 | Hobgood et al. | |
| 8,417,261 B2 | 4/2013 | Huston | |
| 9,619,965 B1* | 4/2017 | Hill | G07F 17/3227 |
| 9,779,517 B2 | 10/2017 | Ballard et al. | |
| 9,798,012 B2 | 10/2017 | Huston | |
| 10,086,262 B1* | 10/2018 | Capper | G06F 1/1626 |
| 2018/0150131 A1* | 5/2018 | Ranieri | G06F 3/017 |
| 2018/0180883 A1 | 6/2018 | Tuli | |
| 2018/0284453 A1* | 10/2018 | Irvin | G02B 27/0172 |
| 2020/0359216 A1* | 11/2020 | Akpinar | H04W 4/024 |
| 2020/0394696 A1* | 12/2020 | Lopez | H04W 4/021 |
| 2021/0201029 A1* | 7/2021 | Ju | G06Q 20/12 |

FOREIGN PATENT DOCUMENTS

JP 5913346 B2 4/2016

* cited by examiner

*Primary Examiner* — Daniel F Hajnik
*Assistant Examiner* — Thomas John Foster
(74) *Attorney, Agent, or Firm* — John Rizvi; John Rizvi, P.A.—The Patent Professor ®

(57) ABSTRACT

A private network tracking device augmented reality (AR) view system and method that facilitates registering wireless tracking device(s) with a private network for generating a private network visual augmented reality view that includes a rendering of the registered wireless tracking device(s) current location therein. In this way, a combination of location-based features and AR features are employed while leveraging the registration of wireless tracking devices with a private network for generating a private network visual AR view that tracks one or more persons, pets, vehicle, objects, assets and other items and is viewed on an AR device.

17 Claims, 13 Drawing Sheets though a browser or headset, which allows people to have real time interactions and experiences across distance bringing together physical environments and the virtual environments. Enhancing and extending the ability to perform location tracking in the context of virtual reality environments of persons, pets, vehicles, objects and physical assets is an area for further deployment of various technologies and associated devices.

SYSTEM AND METHOD OF REGISTERING WIRELESS TRACKING DEVICES INTO A PRIVATE NETWORK VISUAL AUGMENTED REALITY VIEW

CROSS-REFERENCE TO RELATED APPLICATIONS

This application claims the benefit of U.S. Provisional Patent Application 63/403,641 filed Sep. 2, 2022, and U.S. Provisional Patent Application 63/442,588 filed Feb. 1, 2023, each of which is hereby incorporated by reference herein in its entirety.

FIELD OF THE INVENTION

The present invention relates generally to the field of location-based systems, and more particularly, to a system and method that facilitates registering wireless tracking devices with a private network for generating a private network visual augmented reality view that includes a rendering of the current location of the registered wireless tracking devices.

BACKGROUND OF THE INVENTION

Monitoring and keeping track of persons, pets, vehicles, objects and physical assets is an important activity for individuals and entities. There exist a number of conventional tracking techniques. For example, one of the ways to perform location tracking of items such as cargo, persons and assets comprises affixing an active beaconing tag to the item to be tracked, and deploying readers (e.g., a proprietary reader) at key locations (e.g., within the confines of a building) to read signals emitted by the active tag. The readers then transmit the signals to a data system. The active tag typically comprises a sensor that may include a microcontroller, transceiver, sensor chip, and power supply that work in combination and under the control of the microcontroller unit that performs certain data processing locally. Typically, the tag must be within the reading vicinity of a reader in order for a current location (corresponding to the reader's location) to be noted, once the item has left the range of the reader, the actual location will not be known unless and until the tag again comes within the reading range of another reader.

Another solution is to provide an active beaconing tag that does not rely on readers at key locations for tracking but that directly and periodically transmits a signal to a satellite receiver (e.g., a Global Positioning System (GPS)) that in turn transmits the signal to a data system. In this way, continual location tracking of the item can be achieved as the satellite receiver is not confined to a specific location, unlike proprietary readers. Various devices may be used by an individual to register and display the location results such as smartphone or another mobile device. Increasingly, individuals are engaging with virtual environments such as the so-called Metaverse which is used to describe a combination of the virtual reality and mixed reality worlds accessed through a browser or headset, which allows people to have real time interactions and experiences across distance bringing together physical environments and the virtual environments. Enhancing and extending the ability to perform location tracking in the context of virtual reality environments of persons, pets, vehicles, objects and physical assets is an area for further deployment of various technologies and associated devices.

Accordingly, there is need for a system and method that facilitates location tracking using a virtual reality environment.

SUMMARY OF THE INVENTION

The present invention is directed to providing a system and method that facilitates a registering wireless tracking device(s) with a private network for generating a private network visual augmented reality view that includes a rendering of the registered wireless tracking device(s) current location therein.

In a first implementation of the invention, a private network tracking device augmented reality (AR) view system is provided that facilitates registering wireless tracking device(s) with a private network for generating a private network visual augmented reality view that includes a rendering of the registered wireless tracking device(s) current location therein. The system comprising at least: a processor and a memory storing instructions that when executed cause the processor to perform operations comprising: (i) registering one or more augmented reality (AR) devices with a private network, each particular one AR device of the one or more AR devices registered associated with and worn by a respective one user of a plurality of users; (ii) registering a plurality of wireless tracking devices with the private network, each wireless tracking device of the plurality of wireless tracking devices configured for tracking a respective one tracking subject of a plurality of tracking subjects; (iii) tracking, through the private network, a present location for particular ones of the plurality of wireless tracking devices registered, the particular ones of the plurality of wireless tracking devices registered being associated with the respective one user of the plurality of users; (iv) generating an exclusive AR view showing at least the present location tracked of the particular ones of the plurality of wireless tracking devices registered; (v) transmitting, across the private network, the exclusive AR view generated to the particular one AR device associated with and worn by the respective one user, wherein the exclusive AR view generated is exclusive to the respective one user and inaccessible by any other users of the plurality of users; and (vi) displaying the exclusive AR view transmitted on the particular one AR device associated with and worn by the respective one user.

In a second aspect, a method is provided for delivering a private network tracking device AR view system is provided that facilitates registering wireless tracking device(s) with a private network for generating a private network visual augmented reality view that includes a rendering of the registered wireless tracking device(s) current location therein. The method comprising (i) registering one or more AR devices with a private network, each particular one AR device of the one or more AR devices registered associated with and worn by a respective one user of a plurality of users; (ii) registering a plurality of wireless tracking devices with the private network, each wireless tracking device of the plurality of wireless tracking devices configured for tracking a respective one tracking subject of a plurality of tracking subjects; (iii) tracking, through the private network, a present location for particular ones of the plurality of wireless tracking devices registered, the particular ones of the plurality of wireless tracking devices registered being associated with the respective one user of the plurality of users; (iv) generating an exclusive AR view showing at least the present location tracked of the particular ones of the plurality of wireless tracking devices registered; (v) transmitting, across the private network, the exclusive AR view generated to the particular one AR device associated with and worn by the respective one user, wherein the exclusive AR view generated is exclusive to the respective one user and inaccessible by any other users of the plurality of users; and (vi) displaying the exclusive AR view transmitted on the particular one AR device associated with and worn by the respective one user.

In a third aspect, a user device is provided and configured for enabling a private network tracking device AR view system is provided that facilitates registering wireless tracking device(s) with a private network for generating a private network visual augmented reality view that includes a rendering of the registered wireless tracking device(s) current location therein. The user device comprising at least a processor, a display and a memory storing instructions that when executed cause the processor to perform operations comprising (i) registering one or more AR devices with a private network, each particular one AR device of the one or more AR devices registered associated with and worn by a respective one user of a plurality of users; (ii) registering a plurality of wireless tracking devices with the private network, each wireless tracking device of the plurality of wireless tracking devices configured for tracking a respective one tracking subject of a plurality of tracking subjects; (iii) tracking, through the private network, a present location for particular ones of the plurality of wireless tracking devices registered, the particular ones of the plurality of wireless tracking devices registered being associated with the respective one user of the plurality of users; (iv) generating an exclusive AR view showing at least the present location tracked of the particular ones of the plurality of wireless tracking devices registered; (v) transmitting, across the private network, the exclusive AR view generated to the particular one AR device associated with and worn by the respective one user, wherein the exclusive AR view generated is exclusive to the respective one user and inaccessible by any other users of the plurality of users; and (vi) displaying the exclusive AR view transmitted on the particular one AR device associated with and worn by the respective one user.

In a fourth aspect, a private network tracking device AR view application (alternatively referred to herein as an "app") may be executed on the private network tracking device AR view system and/or the user device for executing operations that provide for registering wireless tracking device(s) with a private network for generating a private network visual augmented reality view that includes a rendering of the registered wireless tracking device(s) current location therein. The operations comprising (i) registering one or more AR devices with a private network, each particular one AR device of the one or more AR devices registered associated with and worn by a respective one user of a plurality of users; (ii) registering a plurality of wireless tracking devices with the private network, each wireless tracking device of the plurality of wireless tracking devices configured for tracking a respective one tracking subject of a plurality of tracking subjects; (iii) tracking, through the private network, a present location for particular ones of the plurality of wireless tracking devices registered, the particular ones of the plurality of wireless tracking devices registered being associated with the respective one user of the plurality of users; (iv) generating an exclusive AR view showing at least the present location tracked of the particular ones of the plurality of wireless tracking devices registered; (v) transmitting, across the private network, the exclusive AR view generated to the particular one AR device associated with and worn by the respective one user, wherein the exclusive AR view generated is exclusive to the respective one user and inaccessible by any other users of the plurality of users; and (vi) displaying the exclusive AR view transmitted on the particular one AR device associated with and worn by the respective one user.

In another aspect, a specification is received for a defined boundary area from the respective one user. In another aspect, the exclusive AR view shows at least the present location tracked of the particular ones of the plurality of wireless tracking devices registered in relation to the defined boundary area.

In another aspect, at least one geofence is generated for use in the tracking a present location for particular ones of the plurality of wireless tracking devices registered; and displaying the at least one geofence generated as part of the exclusive AR view generated and displayed.

In another aspect, a different one tracking symbol of a plurality of tracking symbols is used for designating the present location tracked of the particular ones of the plurality of wireless tracking devices registered.

In another aspect, a size or a color of the different one tracking symbol of the plurality of tracking symbols is adjusted.

In another aspect, the size of the different one tracking symbol of the plurality of tracking symbols is adjusted as a function of a proximity of the present location tracked of the particular ones of the plurality of wireless tracking devices registered to a present location of the particular one AR device registered associated with and worn by the respective one user of the plurality of users, and the color of the different one tracking symbol of the plurality of the tracking symbols is adjusted as a function of a movement towards or away from the present location tracked of the particular ones of the plurality of wireless tracking devices registered to a present location of the particular one AR device registered associated with and worn by the respective one user of the plurality of users.

In another aspect, there is displaying a name associated with the respective one tracking subject of at least one of the particular ones of the plurality of wireless tracking devices registered being tracked as part of the exclusive AR view generated and displayed.

In another aspect, at least one of the wireless tracking devices registered is an Apple AirTag or a radio-frequency identification (RFID) tag.

In another aspect, at least one of the wireless tracking devices registered is a mobile device. In another aspect, the mobile device is a smartphone.

In another aspect, each one of the wireless tracking devices registered is affixed to or within the respective one tracking subject associated therewith.

In another aspect, the respective one tracking subject is an object, a person, an animal, a vehicle or a physical asset.

In another aspect, the private network is a virtual private cloud network.

In another aspect, the private network exclusive AR view is received by the particular one AR device associated with and worn by the respective one user across the private network.

In another aspect, a unique identification code is scanned that is associated with at least one wireless tracking device of the plurality of wireless tracking devices for use in the registering thereof.

In another aspect, a path or location history may be displayed as part of the private network exclusive AR view.

In another aspect, multiple users may track the same subjects.

In another aspect, the user may trigger a haptic response (e.g., a vibration) on the respective wireless tracking device of the tracking subject indicating that the tracking subject should return to the user's current location.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
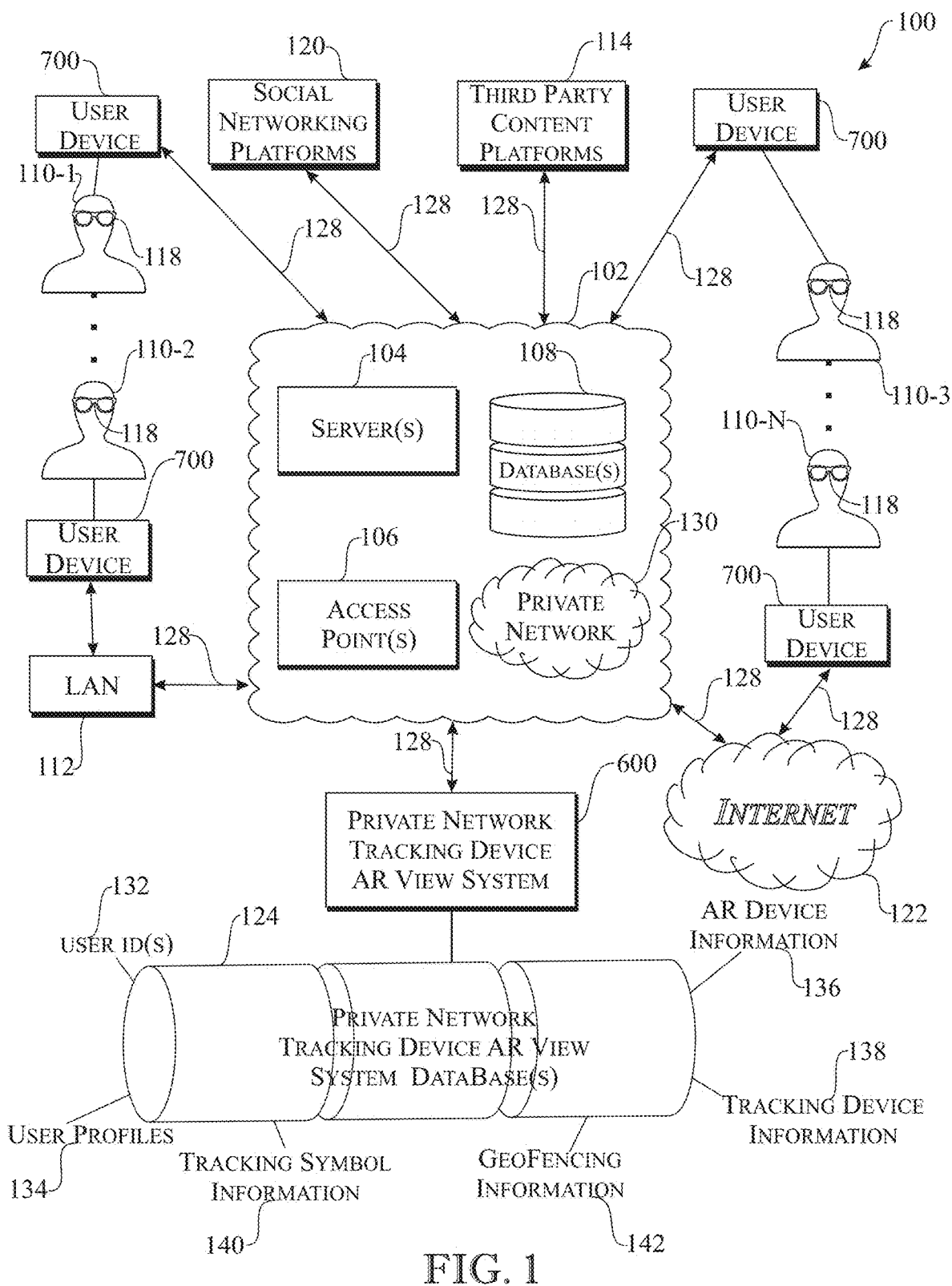
FIG. 1 presents a high-level block diagram of a cloud network services architecture for providing a private network tracking device AR view system in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As shown throughout the figures, the present invention is directed toward a private network tracking device AR view system and method that facilitates registering wireless tracking device(s) with a private network for generating a private network visual augmented reality view that includes a rendering of the registered wireless tracking device(s) current location therein. In this way, the disclosed embodiments combine location-based features and AR features while leveraging the registration of wireless tracking devices with a private network for generating a private network visual AR view that tracks one or more objects, persons, animals, vehicles or physical assets (i.e., "tracking subjects" as used herein) viewed on an AR device. The private network visual AR view is exclusive to a particular user and their associated AR device. Advantageously, the users may simply put on their AR devices and look across their field of view and see a location pin in the air above any subjects being tracked (e.g., loved ones) they have selected in the app to be tracked at that particular moment. Importantly, the private network tracking device AR view system and method of the disclosed embodiments provides an advantageous improvement of practical applications such as location-based systems and platforms, extended reality platforms, extended reality devices, and extending reality applications.

To provide further context for the subject disclosure, a high-level discussion of virtual reality, augmented reality, mixed reality, and extended reality will now be discussed. Virtual reality (VR) or augmented reality (AR) environments have existed for a number of years. VR or AR may refer to simulated environments featuring computer graphics that a user can interact with in a way that is more immersive than merely watching a television or computer screen. Past VR environments have included large pod-like or cockpit-like stations, where a user would sit down inside the station and be able to interact with a panoramic graphical interface that represented some 3-dimensional world. The user would typically utilize some external set of controllers, such as a joystick or interactive glove, in order to move around in the VR environment. Other implementations of VR have included VR goggles, which are head-mounted devices that a user only needs to wear over their eyes. The user can then see the equivalent of a panoramic view that they could have seen in the immersive, pod-like stations, but the goggles enable the user to be more mobile and does not require such a large hardware implementation. The user may manipulate the environment seen through the goggles by using some external device, like a joystick or some other controller AR implementations attempt to blend computer graphics and other images with a user's actual surroundings, such that the user may perceive that their surroundings have been augmented. To achieve this, AR smart eyeglasses that the user may wear typically provide transparent or substantially transparent lenses, so that the user can still see their actual surroundings while viewing other objects at the same time. Companies such as Google, Microsoft, Qualcomm, Epson, Nreal, Rokid, and Lenovo market a variety of AR hardware devices. Other companies such as Apple and Meta have also announced work in the area of AR hardware devices. Modern day smartphones may also include AR capability via their camera systems, allowing the user to point the device at their surroundings and then data overlays occur via their smartphone screen, offering AR capabilities similar to the AR smart eyeglasses.

Augmented reality technology involves modifying a view of a real-world environment (also referred to as a "scene") to enhance the viewer's perception. This can be done, for example, by presenting various AR elements to a user such that the AR elements are incorporated into the user's experience of a scene. By incorporating these AR elements, the user's experience of the scene may thereby become enhanced. Examples of these AR elements include computer-generated data, text, images, sounds, haptics, and the like AR technology may take the form of electronic devices, including wearable devices (e.g., smart eyeglasses), mobile devices (e.g., smartphones), tablets, or laptop computers. These AR devices may perform a variety of AR functions. For example, a pair of smart eyeglasses may include a transparent display capable of presenting various visual AR elements. When a user wears the smart eyeglasses, the display may be positioned in between the user's eyes and the scene that the user is viewing. In this way, the AR elements presented on the display of the smart eyeglasses may be overlaid on top of and/or incorporated into the user's view of the scene. AR can use "markers" or data-based triggers, for instance geolocation, to know where to include AR elements in the user's display. By providing these AR functionalities, AR devices may facilitate social interactions. For example, an AR device may display biographical information about various people that a user might encounter. An AR device may use markers/geolocation or scan a person's face, determine identification information related to the person, and thereafter display some data about that person, such as his name, profession, age, interests, and/or contact information.

In mixed reality (MR), digital and real-world objects are co-existing and may interact with each other in real-time. This immersive technology (sometimes also referred to as hybrid reality) requires an MR headset and typically more processing power than VR or AR applications. Mixed reality does not exclusively take place in either the physical world or virtual world but is a hybrid of AR and VR. To further highlight the difference, AR takes place in the physical world, with information or objects added virtually like an overlay and VR immerses the user in a fully virtual world without the intervention of the physical world. Mixed reality is a blend of physical and digital worlds, unlocking natural and intuitive three-dimensional (3D) human, computer, and environmental interactions. This new reality is based on advancements in computer vision, graphical processing, display technologies, input systems, and cloud computing. As such, AR and VR capabilities are blended, bringing together the physical and digital world to produce an environment where physical and digital objects co-exist and interact in real-time. There are many practical applications of mixed reality, including design, entertainment, military training, and remote working. There are also different display technologies used to facilitate the interaction between users and mixed reality applications.

Extended reality (XR) is a term referring to all real-and-virtual combined environments and human-machine interactions generated by computer technology and wearables and includes representative forms such as AR, VR, and MR, and the areas interpolated among them. The levels of virtuality range from partially sensory inputs to immersive virtuality such that XR is a superset which includes the entire spectrum from the "complete real" to the "complete virtual" in conceptual terms. Still, its connotation lies in the extension of human experiences, especially relating to the senses of existence (represented by VR) and the acquisition of cognition (represented by AR).

As used herein, the term "extended reality (XR)" is an umbrella term for all immersive technologies including, but not limited to, augmented reality (AR), virtual reality (VR), and mixed reality (MR). XR refers to all real-and-virtual combined environments and human-machine interactions generated by computer technology and wearables and includes representative forms such as AR, VR, and MR, and the areas interpolated among them. The levels of virtuality range from partially sensory inputs to immersive virtuality such that XR is a superset which includes the entire spectrum from "the complete real" to "the complete virtual" in conceptual terms. XR's connotation lies in the extension of human experiences especially relating to the senses of existence (represented by VR) and the acquisition of cognition (represented by AR). To that end, as used herein: (i) augmented reality (AR): in an augmented reality, virtual information and objects are overlaid over the real world such that the experience enhances the real world with digital details (e.g., images, text, and animation). An individual may access this user experience through AR glasses or via screens, tablets, or smartphones, for example. In this way, users are not isolated from the real world and may still interact and see what is going on in front of them; (ii) virtual reality (VR): in contrast to AR, a VR experience fully immerses the individual in a simulated digital environment. An individual uses a VR headset or head-mounted display to engage with a 360-degree view of an artificial world that manipulates their brain into believing they are performing or engaging in a particular activity (e.g., walking on the moon, stepping into a castle or whatever environment is created by the VR developers); and (iii) mixed reality (MR): in mixed reality, digital and real world objects co-exist and may interact with one another in real-time. A user employs a MR headset to engage the MR environment that, for example, may place digital objects in a room where the user is standing and give that user the ability to control (e.g., spin) the objects and/or interact with the digital objects in almost any way possible. While the disclosed embodiments herein focus on an AR environment and application it will be understood that the principles described herein are equally applicable to XR, VR, and MR, and the areas interpolated among them.

Turning our attention to FIG. 1, a high-level block diagram is presented of a cloud network services architecture 100 for use with a private network tracking device AR view system 600 in accordance with an embodiment. As will be detailed herein below, the cloud 102 facilitates the delivery of private network tracking device AR view services to a plurality of users (e.g., comprised by user 110-1, 110-2, 110-3 through 110-N) that are offered by and through the private network tracking device AR view system 600 using a private network tracking device AR view app 800, as will be detailed herein below, on user device 700. The user device 700 provides various users (e.g., user 110-1 through user 110-N) with real-time access to private network tracking device AR view services in accordance with the disclosed embodiments herein. In an embodiment, the private network tracking device AR view processing, offered by and through the cloud network services architecture 100 and the private network tracking device AR view system 600 will be facilitated by the private network tracking device AR view app 800 (see, FIG. 8), as will be detailed herein below, executing on the user device 700 (see, FIG. 7).

As noted above, the cloud 102 comprises at least server(s) 104, the access point(s) 106 and the database(s) 108. Importantly, in an embodiment, private network 130 is hosted and provided by and through cloud 102 with the private network 130 playing a pivotal role in the context of the principles of the disclosed embodiments as detailed herein. Illustratively, the private network 130 may be a virtual private cloud network that is a secure, isolated private cloud hosted within a public cloud (e.g., the cloud 102). In this way, the virtual private cloud network combines the scalability and convenience of public cloud computing with the data isolation of private cloud computing. Such data isolation is advantageous for generating the private network visual AR views that track one or more objects, persons, animals, vehicles and/or physical assets and are viewed on an AR device in accordance with the principles of the disclosed embodiments. Of course, consistent with the principles of the disclosed embodiments, any type of private network may be used that is configured such that restrictions are established to form and promote a secured environment that limits access other than to authorized users. As such, this type of private network may be configured in such a way that only a selected set of devices can access the private network as a function of settings encoded in the network routers and access points. Cloud, cloud service, cloud server and cloud database are broad terms and are to be given their ordinary and customary meaning to one of ordinary skill in the art and includes, without limitation, any database, data repository or storage media which store content typically associated with and managed by users, social networking platforms (e.g., social networking platforms 120) and third-party content providers (e.g., third-party content providers 114) in the context of private network tracking device AR view services, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 700). The cloud server may be implemented in one or more servers and may send and receive content in a various forms and formats, user supplied and/or created information/content and profile/configuration data that may be transferred from or stored in a cloud database (e.g., the databases 108).

A cloud database may include one or more physical servers, databases or storage devices as dictated by the cloud service's storage requirements. The cloud database may further include one or more well-known databases (e.g., an SQL database) or a fixed content storage system to store content, user profile information, configuration information, administration information and any other information necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools.

Figure 2:
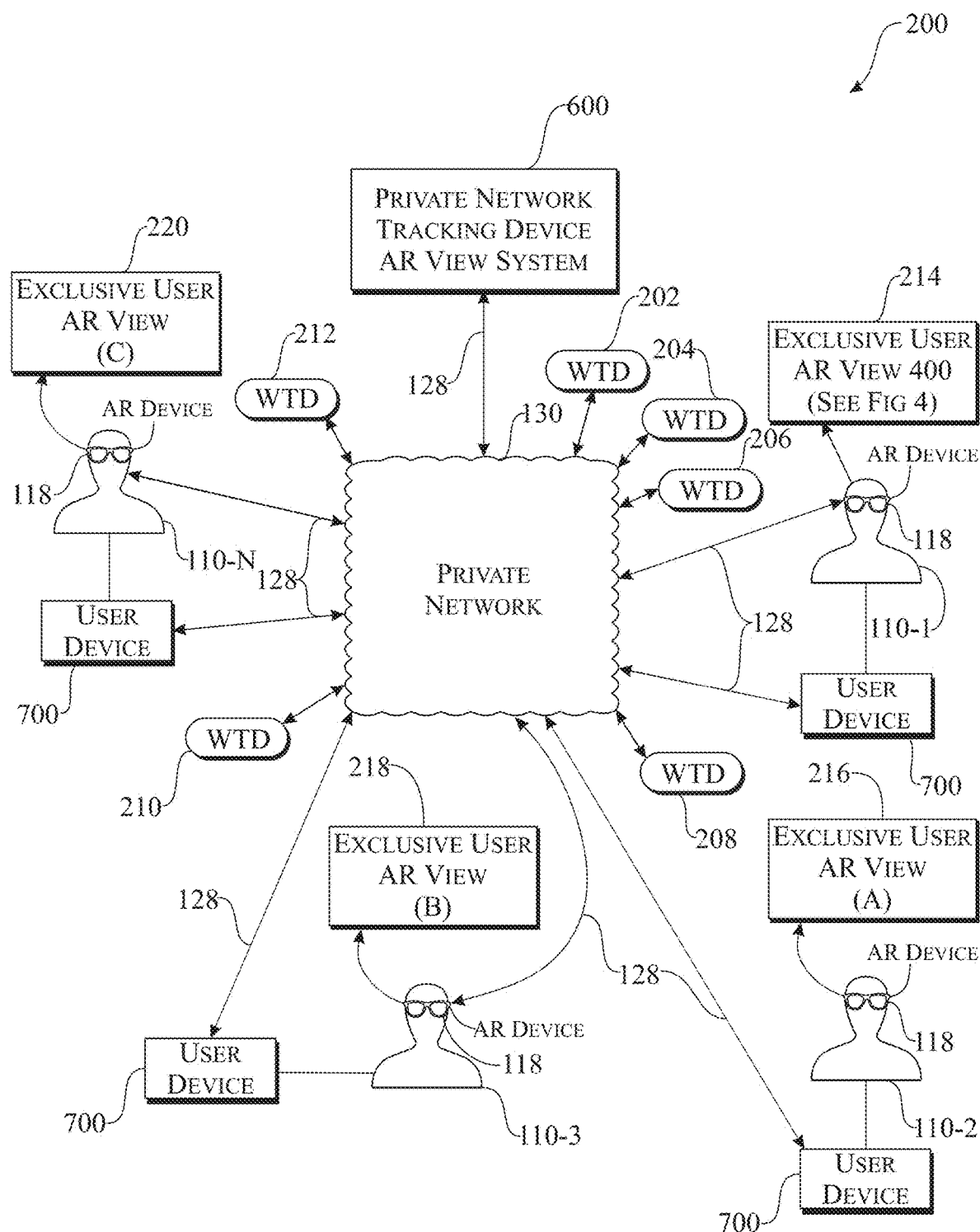
FIG. 2 presents an illustrative block diagram illustrating the registering wireless tracking device(s) with a private network for generating a private network visual augmented reality view that includes a rendering of the registered wireless tracking device(s) current location therein and how the user's AR device engages and views the private network visual augmented reality view created in accordance with an embodiment.
Figure 3:
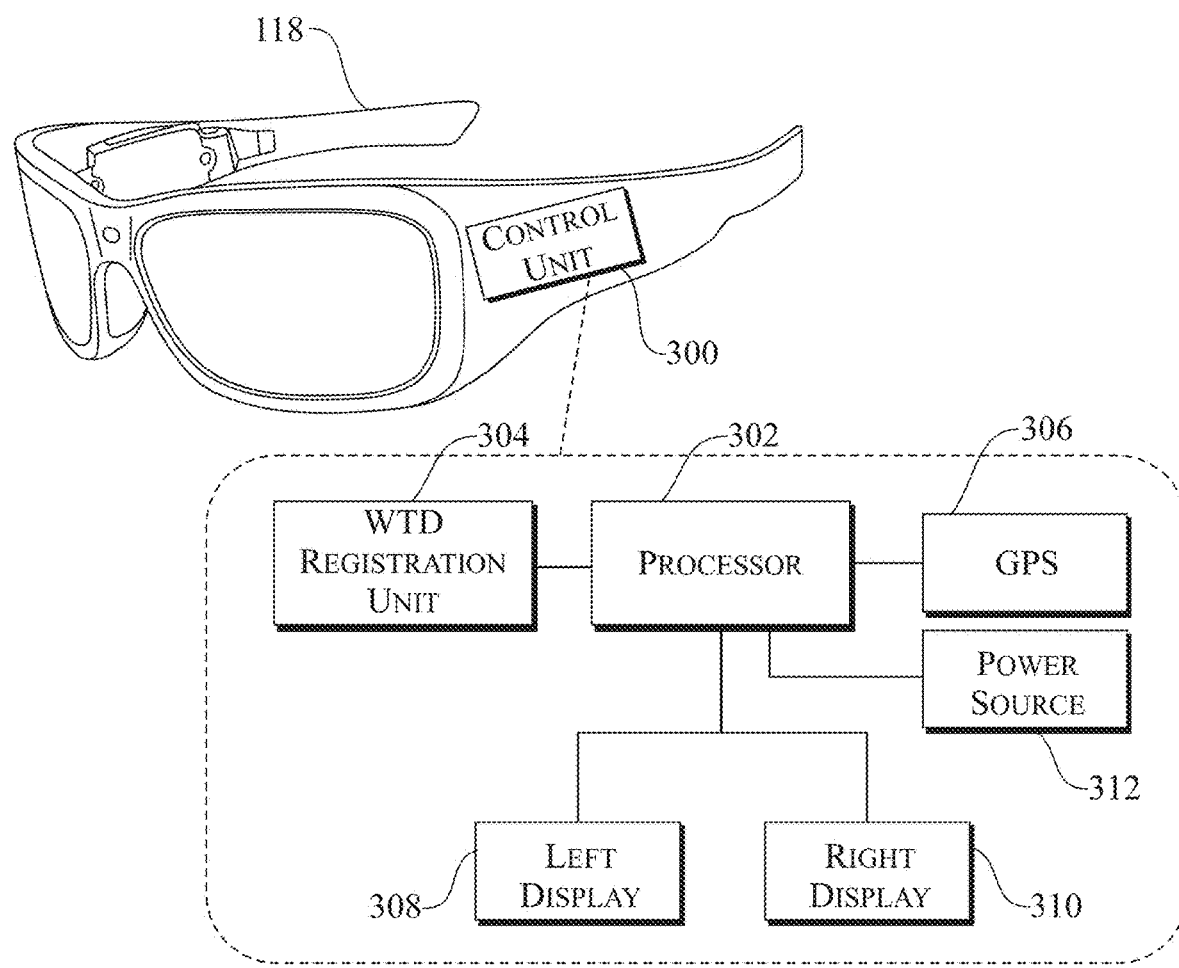
FIG. 3 presents an illustrative AR device configured for use with a private network tracking device AR view system in accordance with an embodiment.

To further illustrate and detail the aforementioned operational aspects of the disclosed embodiments, we now turn our attention to FIGS. 2 and 3. An illustrative block diagram 200 is shown in FIG. 2 illustrating the registering wireless tracking device(s) with a private network for generating a private network visual augmented reality view that includes a rendering of the registered wireless tracking device(s) current location therein and how the user's AR device engages and views the private network visual augmented reality view created in accordance with an embodiment and an illustrative AR device is shown in FIG. 3 configured for use with a private network tracking device AR view system in accordance with an embodiment in accordance with an embodiment. More particularly, each of users 110-1, 110-2, 110-3, and 110-N is wearing a respective AR device 118 which communicates, for example, with the private network tracking device AR view system 600 and the private network 130 over the communications links 128. Illustratively, each user is executing the private network tracking device AR view app 800 on their respective user device 700, as detailed herein. Each of these users is experiencing an AR environment and an exclusive AR view (i.e., exclusive AR view 214, exclusive AR view 216, exclusive AR view 218, and exclusive AR view 220) in accordance with the principles of the disclosed embodiments, which is generated as a function of the wireless tracking devices registered with the private network 130. For example, wireless tracking devices (WTD) 202, WTD 204, and WTD 206 that have been registered and are associated with the user 110-1 for tracking one or more persons, pets, objects, vehicles, physical assets and other items that are of interest to the user 110-1 (e.g., the current location of their children). In a similar fashion, WTD 208 is associated with the user 110-2, WTD 210 is associated with the user 110-3, and WTD 212 is associated with the user 110-N. In this way, each exclusive AR view is generated solely for the use and access by the particular user (and viewing through their respective AR device 118 as worn thereby) in accordance with the registered WTDs associated therewith. In an embodiment, each one of the wireless tracking devices registered is affixed to (e.g., on a person's clothing) or within (e.g., inside a vehicle) the respective one tracking subject. In an embodiment, one or more of the WTDs registered is an Apple AirTag or a radio-frequency identification (RFID) tag. In an embodiment, in addition to being registered with the private network 130 the WTDs may be registered with the user device 700. For example, the WTD 202 may be configured for tracking a current location of a child of the user 110-1 and exclusive AR view 214 may be generated in accordance with private network visual AR view 400 as shown in FIG. 4 in accordance with an embodiment.

Figure 4:
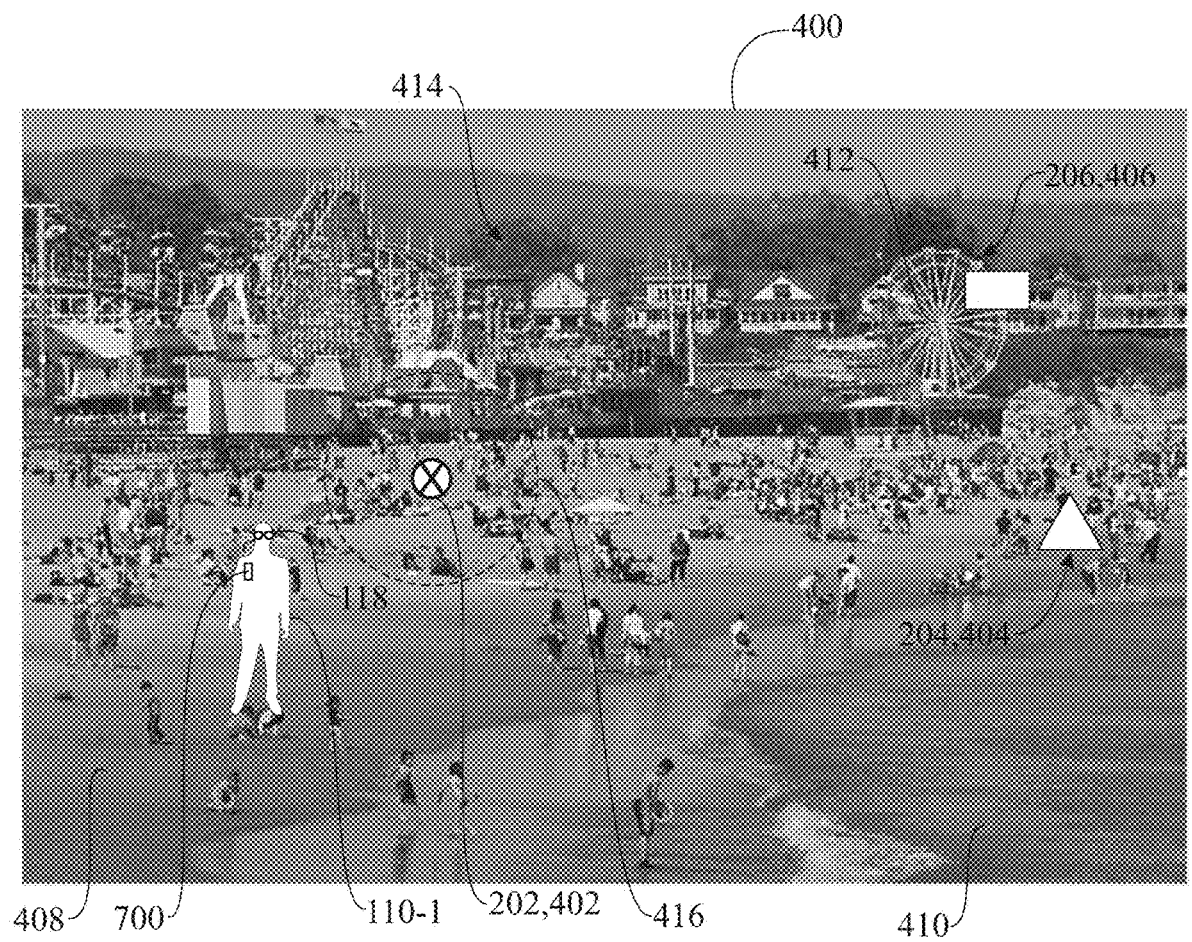
FIG. 4 presents an illustrative user AR device view showing a private network visual augmented reality view created hereunder in accordance with an embodiment.

As shown in FIG. 4, the exemplary private network visual AR view 400 comprises renderings of the user 110-1 who is employing the user device 700 for executing the private network tracking device AR view app 800 and wearing their respective AR device 118. In accordance with the principles of the disclosed embodiments, the WTD 202 has been registered with the private network 130 and is represented using a different one symbol (i.e., symbol 402, symbol 404, and symbol 406) of a plurality of tracking symbols used for designating the present location tracked of the particular ones of the registered plurality of wireless tracking devices For example, as shown in FIG. 4, present locations are tracked in an area encompassing amusement park and boardwalk 414, beach area 408 swimming area 410, and amusement ride 412. As will be understood, this is an illustrative example, and the tracking of the wireless tracking devices is not restricted to any particular area(s) in any way unless specified by the user. For example, in an embodiment, a defined boundary area (e.g., a defined geographical area) may be specified by the user in which the tracking will take place. In another aspect, the exclusive AR view shows at least the present location tracked of the particular ones of the plurality of wireless tracking devices registered in relation to the defined boundary area. In an embodiment, a geofence may be used in the tracking the present location of any one or all of the registered wireless tracking devices and the geofence boundaries may be displayed as part of the exclusive AR view generated. As will be understood, a geofence is a virtual perimeter for a real-world geographic area. A geofence could be dynamically generated as in a radius around a point location, or a geofence can be a predefined set of boundaries (such as school zones or neighborhood boundaries). The use of a geofence is called geofencing, and one example of usage involves a location-aware device (e.g., the WTD 202) entering or exiting a geofence boundary. This activity could trigger an alert to the device's user as well as messaging to the geofence operator. As such, geofencing is a location-based service in which an app (e.g., the private network tracking device AR view app 800) or other software uses GPS, RFID, Wi-Fi or cellular data to trigger a pre-programmed action when a wireless tracking device, mobile device or RFID tag (i.e., one of the wireless tracking devices herein) enters or exits a virtual boundary set up around a geographical location as the geofence. Depending on how a geofence is configured it can prompt mobile push notifications, trigger text messages or alerts, and/or deliver location-based data. To make use of geofencing, an administrator or developer must first establish a virtual boundary around a specified location in GPS-enabled or RFID-enabled software. Illustratively, this is accomplished by drawing a circle of some determined distance (e.g., one (1) mile) around a geographic location (e.g., on Google Maps), as specified by the private network tracking device AR view app 800, for example. This virtual geofence (e.g., geofence 416) will then trigger a response when an authorized device (i.e., one or more of the wireless tracking devices as registered with the private network 130) enters or exits that specified area.

In an embodiment, a size or a color may be adjusted of the different one symbol (e.g., the symbol 402) of the plurality of tracking symbols to designated when the WTD 202 moves closer or further away from the AR device 118 worn by the user 110-1. For example, the size of the different one symbol of the plurality of tracking symbols may be adjusted as a function of a proximity of the present location tracked of the particular ones of the registered plurality of wireless tracking devices to a present location of the particular one registered AR device associated with and worn by the respective one user of the plurality of users. Similarly, the color of the different one symbol of the plurality of the tracking symbols may be adjusted as a function of a movement towards or away from the present location tracked of the particular ones of the registered plurality of wireless tracking devices to a present location of the particular one registered AR device associated with and worn by the respective one user of the plurality of users. In an embodiment, a name associated with the respective one tracking subject (e.g., a child's name) of at least one of the particular ones of the plurality of registered wireless tracking devices being tracked is displayed at their current location as part of the exclusive AR view generated. In an embodiment, the user may trigger a haptic response (e.g., a vibration) on the respective wireless tracking device of the tracking subject indicating that the tracking subject should return to the user's current location, for example.

Turning our attention to FIG. 3, an illustrative AR device 118 is shown configured for use with a private network tracking device AR view system 600 in accordance with an embodiment in accordance with an embodiment. The illustrative AR device 118 shown having an eyeglass configuration comprising control unit 300 that may be located anywhere in or on the physical frame of the AR device 118. Of course, other configurations for the AR device 118 may be utilized as well consistent with the principles of the disclosed embodiments. The control unit 300 provides functionality including, but not limited, interfacing with the private network tracking device AR view system 600, the private network tracking device AR view app 800, the user device(s) 700, and the wireless tracking devices 202, 204, 206, 208, 210, and/or 212. The control unit 300 comprises processor 302, WTD registration unit 304, GPS module 306, left display 308, right display 310, and power source 312 (e.g., a battery). The processor 302 may be a microcontroller and include both general and special purpose microprocessors and may be the sole processor or one of multiple processors of the device. Further, the processor 302 may comprise one or more central processing units (CPUs) and may include, be supplemented by, or incorporated in, one or more application-specific integrated circuits (ASICs) and/or one or more field programmable gate arrays (FPGAs). The left display 308 and the right display 310 may be configured using a transparent liquid crystal display (LCD) or other suitable display. The WTD registration unit 304 may be utilized to interface with and/or for the registration of the wireless tracking devices 202, 204, 206, 208, 210, and/or 212 with the private network 130.

Figure 5:
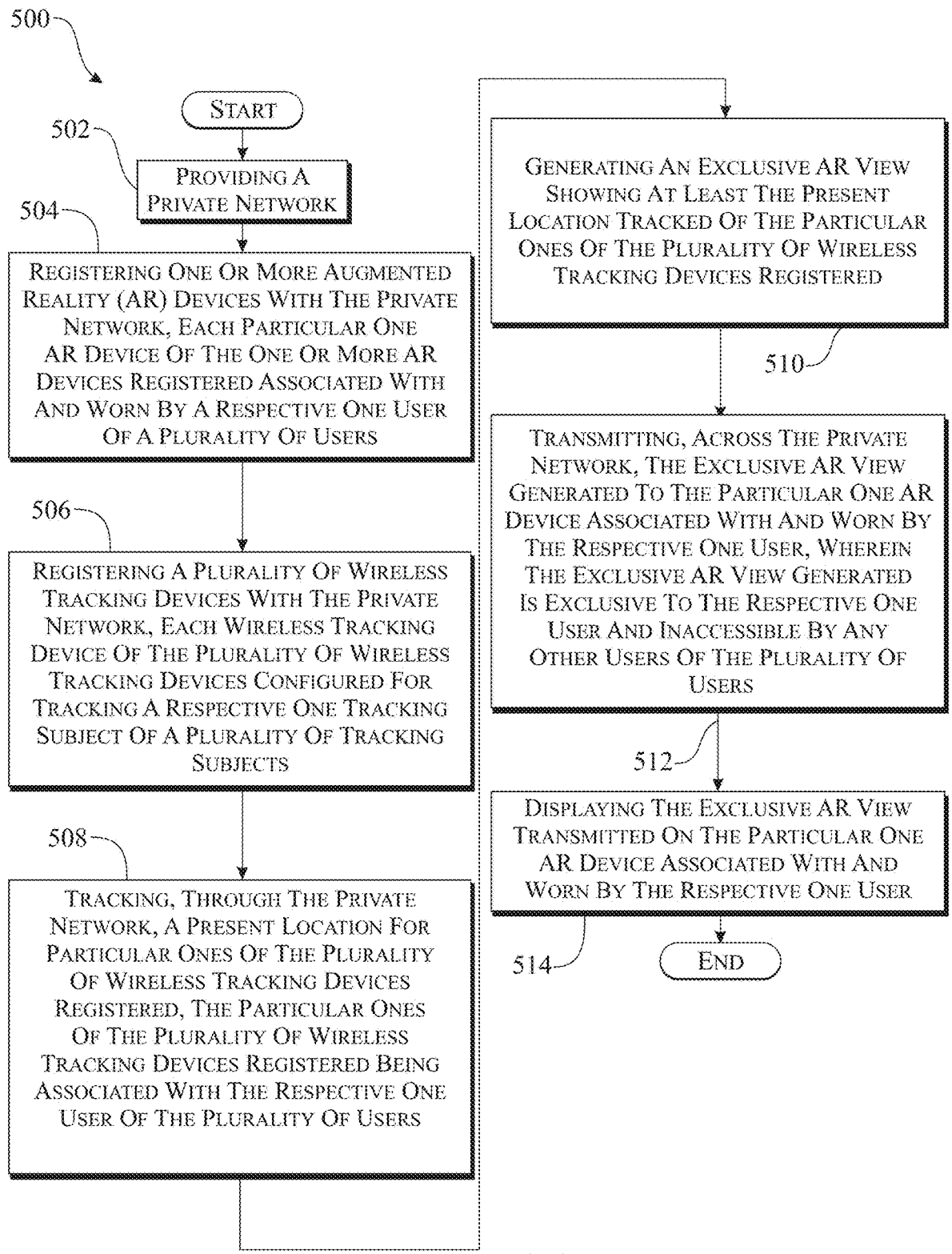
FIG. 5 presents a flowchart of illustrative operations for registering wireless tracking device(s) with a private network for generating a private network visual augmented reality view that includes a rendering of the registered wireless tracking device(s) current location therein in accordance with an embodiment.

Turning our attention to FIG. 5, a flowchart of illustrative operations 500 is shown for registering wireless tracking device(s) with a private network for generating a private network visual augmented reality view that includes a rendering of the registered wireless tracking device(s) current location therein in accordance with an embodiment. More particularly, at step 502, providing a private network (e.g., the private network 130) and at step 504, registering one or more augmented reality (AR) devices (e.g., the AR device 118) with a private network, each particular one AR device of the one or more AR devices registered associated with and worn by a respective one user (e.g., the user 110-1) of a plurality of users. At step 506, registering a plurality of wireless tracking devices (e.g., the WTDS 202, 204, 206, 208, 210, and 212) with the private network, each wireless tracking device of the plurality of wireless tracking devices configured for tracking a respective one tracking subject of a plurality of tracking subjects. In an embodiment, the registration further includes scanning a unique identification code associated with at least one wireless tracking device of the plurality of wireless tracking devices for use in the registering thereof. At step 508, tracking, through the private network, a present location for particular ones of the plurality of wireless tracking devices registered, the particular ones of the plurality of wireless tracking devices registered being associated with the respective one user of the plurality of users. In an embodiment, there is an optional feature of receiving a specification (e.g., a defined geographical area or location of interest) for a defined boundary area from the respective one user. Then, at step 510, generating an exclusive AR view (e.g., the private network visual AR view 400) showing at least the present location tracked of the particular ones of the plurality of wireless tracking devices registered.

At step 512, transmitting, across the private network, the exclusive AR view generated to the particular one AR device associated with and worn by the respective one user, wherein the exclusive AR view generated is exclusive to the respective one user and inaccessible by any other users of the plurality of users. Thus, there is a receiving by the particular one AR device associated with and worn by the respective one user across the private network the exclusive AR view transmitted. Then, displaying, at step 514, the exclusive AR view transmitted on the particular one AR device associated with and worn by the respective one user.

Figure 6:
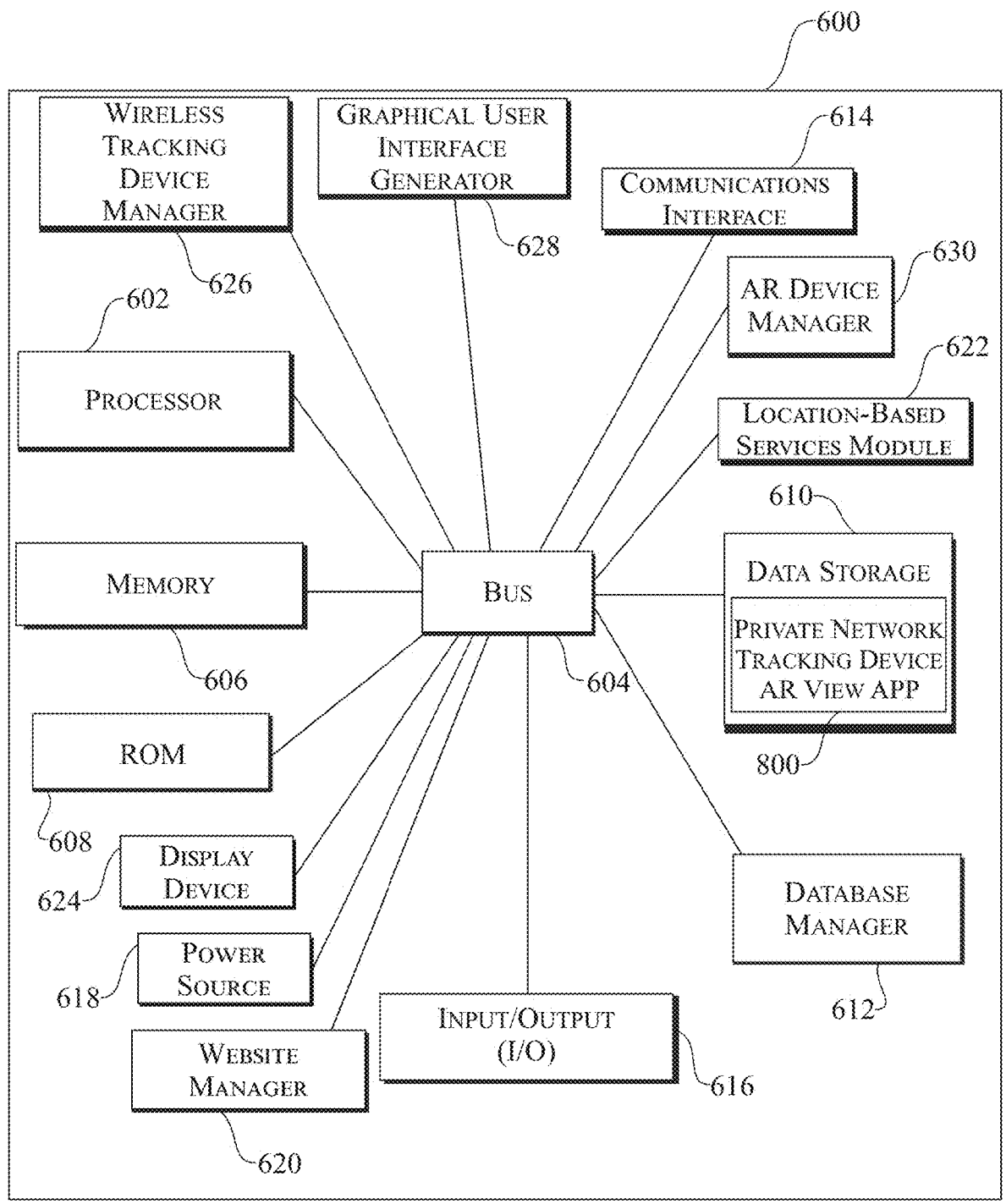
FIG. 6 presents illustrative private network tracking device AR view system in accordance with an embodiment.

Turning our attention to FIG. 6, an illustrative configuration for the private network tracking device AR view system 600 is shown. More particularly, the private network tracking device AR view system 600 comprises processor 602 for executing program code (e.g., private network tracking device AR view app 800) and communications interface 614 for managing communications to and from the private network tracking device AR view system 600, memory 606, data storage 610, and/or read-only memory (ROM) 608 for storing program code and data, and power source 618 for powering the private network tracking device AR view system 600. The memory 606 is coupled to the bus 604 for storing computer-readable instructions to be executed by the processor 602 (e.g., execution of the private network tracking device AR view app 800). Database manager 612 is used to manage the delivery and storage of content, data, and other information in the private network tracking device AR view system database(s) 124, database(s) 108 and across third-party content providers, for example. The private network tracking device AR view system database(s) 124 may store and provide information including, but not limited to, user IDs 132, user profiles 134, AR device information 136, tracking device information 138, tracking symbol information 140, and geofencing information 142, each as shown in FIG. 1. The wireless tracking device manager 626 and AR device manager 630 facilitate execution of the various private network tracking device AR view operations hereunder. As will be detailed further herein below, the operations performed by for the private network tracking device AR view system 600 in combination with the private network tracking device AR view app 800, for example, provide for registering wireless tracking device(s) with a private network for generating a private network visual augmented reality view that includes a rendering of the registered wireless tracking device(s) current location therein in accordance with the disclosed embodiments.

Website manager 620 is used to deliver and manage content, data, and other information across one or more websites that may be utilized to access and use the private network tracking device AR view system 600, for example. Further, the operations provided by and through the private network tracking device AR view app 800 may be offered through a web-based application. As will be discussed in greater detail herein below, the private network tracking device AR view app 800, as stored in data storage 610, when executed by the processor 602 will enable access by a plurality of users (e.g., user 110-1, 110-2, 110-3 through 110-N) to the private network tracking device AR view system 600 for the processing of, for example, the user IDs 132, user profiles 134, AR device information 136, tracking device information 138, tracking symbol information 140, and geofencing information 142. Location-based services manager 622 facilitates the delivery of location-based services (e.g., GPS tracking) either independently or on user device 700. This allows the private network tracking device AR view system 600 to register the exact location of the user of the wireless tracking devices and/or the user device 700, for example, as the tracking subjects and/or users roams from one location to another location such that the services offered via the private network tracking device AR view processing hereunder may be delivered and/or tailored to a current location.

In an embodiment, the private network tracking device AR view processing provided through the execution of the private network tracking device AR view app 800 may also include a web-based delivery platform and/or accessing and interfacing any number of websites using website manager 620 for procuring information and data that can be used in the private network tracking device AR view system 600. The term "website" in the context herein is used in a conventional and broadest sense and is located on at least one server containing web pages stored thereon and is operational in a 24-hour/7-day typical fashion. Further, as shown in the cloud network services architecture 100, the plurality of users (i.e., the user 110-1 through user 110-N) may alternatively utilize well-known Internet 122 for access to private network tracking device AR view system 600 by and through a web browser on the user device 700, for example. The private network tracking device AR view system 600 may also include one or more input/output devices 616 that enable user interaction with the user device 700 (e.g., camera, display, keyboard, mouse, speakers, microphone, buttons, etc.). The input/output devices may include peripherals, such as an NFC device (e.g., NFC tag reader), camera, printer, scanner (e.g., a QR-code scanner), touchscreen display, etc. For example, the input/output devices 616 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 700 or an associated display device 624, for example, that may also be managed by graphical user interface generator 628.

The communications interface 614 is used to facilitate communications across the communications links 128 (see, FIG. 1) within the cloud network services architecture 100. This may take the form, for example, of a wide area network connection that communicatively couples the private network tracking device AR view system 600 with the access points 106 (see, FIG. 1) which may be a cellular communications service. Similarly, communications managed by the communications interface 614 may take the form, for example, of a local Wi-Fi network interface or Ethernet interface the communicatively couples the private network tracking device AR view system 600 with the Internet 122, local area network (LAN) 112, and ultimately the user device 700. In the instant embodiment, the private network tracking device AR view app 800 and/or the communications interface 614 may include a communications stack for facilitating communications over the respective communications link 128. Electronic communications by and through private network tracking device AR view system 600 between the various systems, networks, devices, users, entities, and/or individuals are facilitated by the communications links 128 in accordance with any number of well-known communications protocols and methods (e.g., wireless communications).

Figure 7:
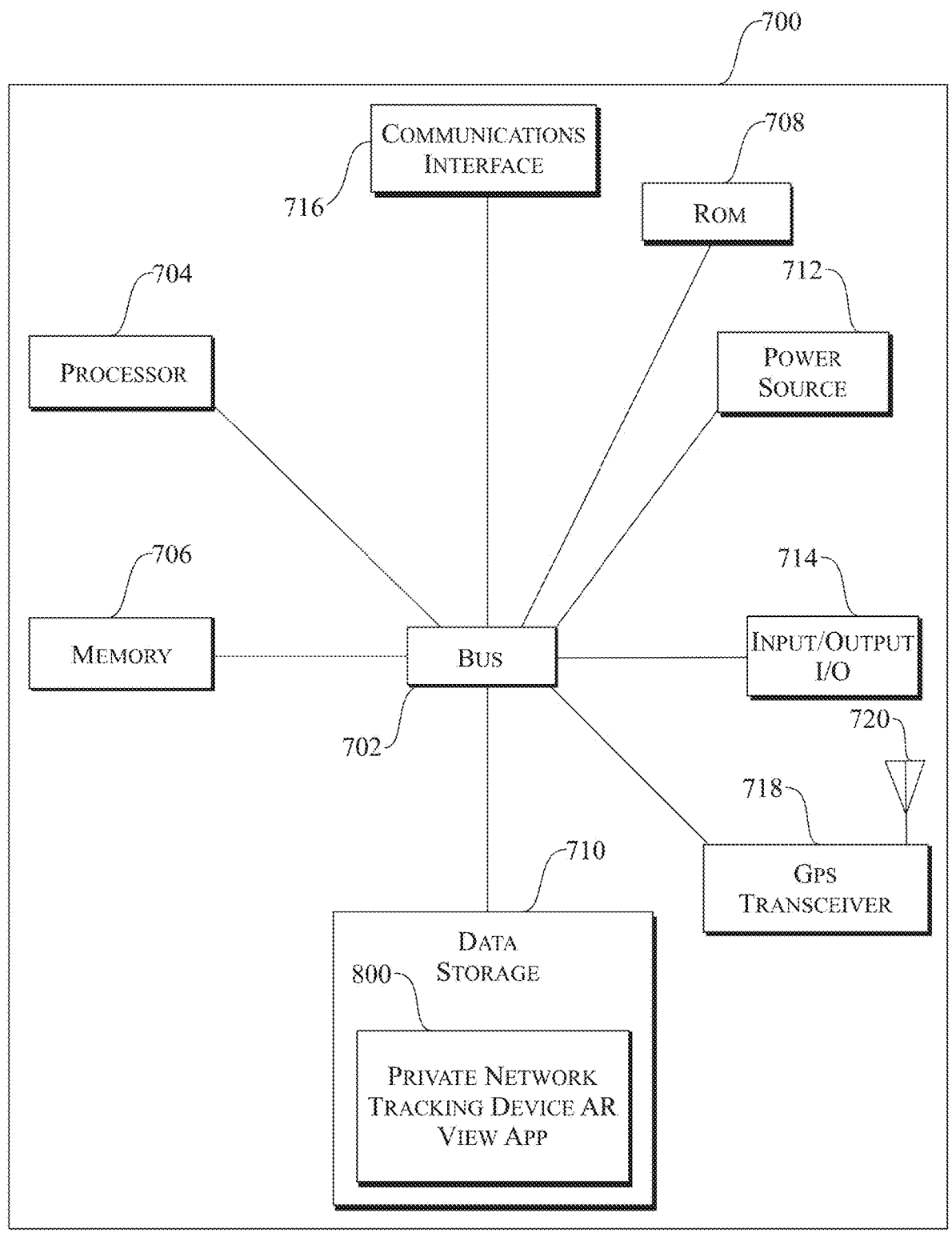
FIG. 7 presents an illustrative user device configured for use with the private network tracking device AR view system in accordance with an embodiment.

Turning our attention briefly to FIG. 7, an illustrative user device 700 is shown for use with, illustratively, the private network tracking device AR view system 600 in accordance with an embodiment. The user device 700 typically includes bus 702 and processor 704 coupled to the bus 702 for executing operations and processing information. As will be appreciated, a "user device" in the context herein may comprise a wide variety of devices such as any type of hardware device, AR device, mobile devices, smartphones, laptop computers, desktop computers, tablets, kiosks, and wearable devices, to name just a few, that execute applications (e.g., a mobile application) in accordance with the principles of the disclosed embodiments herein. For example, the execution of the private network tracking device AR view app 800 which will be discussed in much greater detail herein below. The processor 704, as powered by power source 712, may include both general and special purpose microprocessors, and may be the sole processor or one of multiple processors of the device. This is equally applicable to the processor 602 of FIG. 6. Further, the processor 704 (or the processor 602) may comprise one or more central processing units (CPUs) and may include, be supplemented by, or incorporated in, one or more application-specific integrated circuits (ASICs) and/or one or more field programmable gate arrays (FPGAs).

The user device 700 may also include memory 706 coupled to the bus 702 for storing computer-readable instructions to be executed by the processor 704. The memory 706 may also be utilized for storing temporary variables or other intermediate information during the execution of the instructions by the processor 704. The user device 700 may also include ROM 708 or other static storage device coupled to the bus 702. Further, data storage device 710, such as a magnetic, optical, or solid-state device may be coupled to the bus 702 for storing information and instructions for the processor 704 including, but not limited to, the private network tracking device AR view app 800. Data storage device 710 (or the data storage device 610) and the memory 706 (and the memory 606) may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 700 may also include one or more communications interface 716 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 716 (or the communications interface 614) may be an integrated services digital network (ISDN) card or modem/router used to facilitate data communications of various well-known types and formats. Further, illustratively, the communications interface 716 (or the communications interface 614) may be a LAN card used to provide data communication connectivity to a comparable LAN. Wireless communication links may also be implemented. The GPS transceiver 718 and antenna 720 facilitate delivery of location-based services in order to register the exact location of the user device 700, for example, as the user roams from one location to another location. As will be understood, the application herein will be able to track individual users and their location (and proximities to other locations) upon the launching of the application thereby enabling the well understood GPS location features of the user device 700 (e.g., a smartphone).

As will be appreciated, the functionality of the communications interface 716 (or the communications interface 614) is to send and receive a variety of signals (e.g., electrical, optical, or other signals) that transmit data streams representing various data types. The user device 700 may also include one or more input/output devices 714 that enable user interaction with the user device 700 such as a camera, display, keyboard, mouse, speakers, microphone, buttons, etc. The input/output devices 714 (or I/O devices 616) may include peripherals, such as an NFC device (e.g., NFC reader), camera, printer, scanner (e.g., QR-code scanner), touchscreen display, etc. For example, the input/output devices 714 (or the I/O devices 616) may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 700 or an associated display device, for example.

Figure 8:
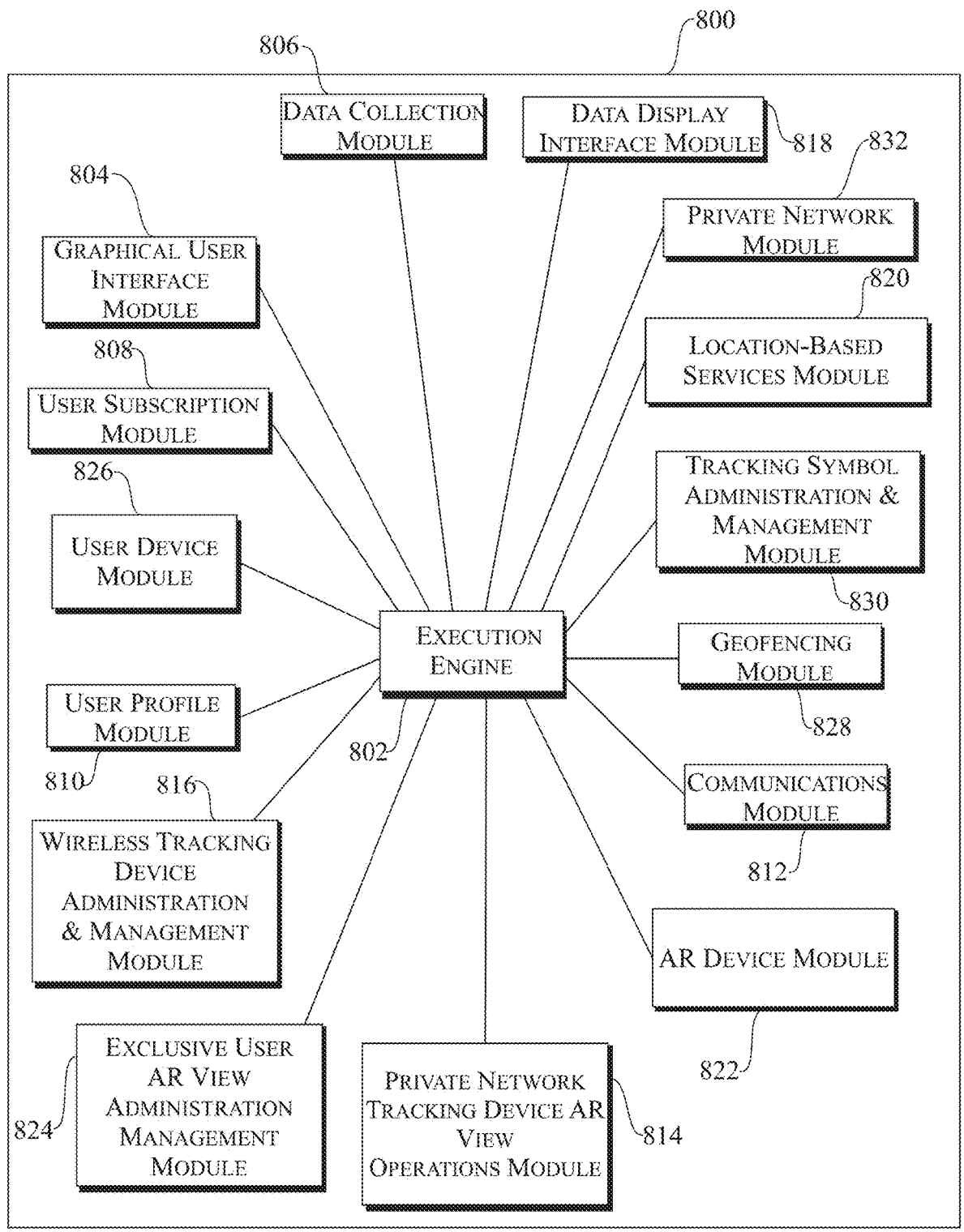
FIG. 8 presents an illustrative architecture for a private network tracking device AR view app in accordance with an embodiment.

Turning our attention to FIG. 8, an illustrative architecture for the operation of the private network tracking device AR view app 800 is presented in accordance with an embodiment. As will be appreciated, the architecture may be used, illustratively, in conjunction with the cloud network services architecture 100, the private network tracking device AR view system 600, the private network 130, the AR device(s) 118 and/or the user device(s) 700 for launching and executing the private network tracking device AR view app 800 and its associated operations. As shown, the architecture for the operations of the private network tracking device AR view app 800 provides several interfaces and engines used to perform a variety of functions such as the collection, aggregation, manipulation, processing, analyzing, verification, authentication, and display of applicable real-time information and data that are useful to realize the delivery of the private network tracking device AR view operations of the disclosed embodiments. More particularly, data display interface module 818 and communications module 812 are used to facilitate the input/output and display of electronic data and other information to, illustratively, the users (e.g., user 110-1 through user 110-N) employing the user device 700 (e.g., a touch screen of the user device 700) and executing the private network tracking device AR view app 800. The data collection module 806 facilitates data gathering from the plurality of users and other third parties. The location-based services module 820 provides for the delivery of location-based services in order for the geographic locations of the users to be identified and displayed (e.g., GPS locations) including within the geofence boundary areas, as detailed previously. The communications module 812 will also facilitate communications by and through the private network tracking device AR view system 600, for example.

Execution engine 802 may be employed to deliver the private network tracking device AR view services herein through the execution of the private network tracking device AR view app 800. In such delivery, the execution engine 802 will operate and execute, as further detailed herein below, with at least the following program modules: graphical user interface module 804, data collection module 806, user subscription module 808, user profile module 810, communications module 812, private network tracking device AR view operations module 814, wireless tracking device administration and management module 816, data display interface module 818, location-based services module 820, AR device module 822, exclusive user AR view administration and management module 824, user device module 826, geofencing module 828, tracking symbol administration and management module 830, and private network module 832. The user subscription module 808 provides for the delivery and management of a subscription-based private network tracking device AR view services model whereby individual users (e.g., user 110-1 through user 110-N) subscribe in order to access the private network tracking device AR view services through execution of the private network tracking device AR view app 800 and engaging in their private network tracking device AR view platform activities. In an embodiment, the user may initially subscribe, as facilitated by the user subscription module 808 for a defined fee in a tier subscription system such that users who pay more for their access subscription are provided priority and other advantages over other users in lower tiers or who are subscribed through a base "no fee" trial plan (e.g., a free 30 day trial period). Illustratively, a user paying the subscription fee may be able to access an unlimited number of wireless tracking devices on a priority basis or have the ability to be presented a more diverse selection of tracking features. The user subscription module 808 will also provide for the creation and maintenance of individual user profiles for each subscribed user in conjunction with the user profile module 810 that will manage and administer such user profiles. Further, in an embodiment, the graphical user interface module 804, data display interface module 818, and the communications module 812 are used to facilitate the input/output and display of electronic data and other information (e.g., a graphical user interface) to, illustratively, the users (e.g., user 110-1 through user 110-N) employing the user device 700 (e.g., a touch screen) and executing the private network tracking device AR view app 800. The communications module 812 may also enable the triggering of a haptic response (e.g., a vibration) on the respective wireless tracking device of the tracking subject indicating that the tracking subject should return to the user's current location, for example. The data collection module 806 facilitates private network tracking device AR view services information collection from the plurality of users (e.g., user 110-1 through user 110-N). The data collection module 806 may also be used to collect a variety of private network tracking device AR view services information from other virtual and/or electronic sources accessible via the Internet 122 and individual third party websites hosted thereon. The operations executed by each and every of the foregoing modules are, for example, as discussed throughout the present disclosure.

Those skilled in the art will appreciate that the present disclosure contemplates the use of systems configurations and/or computer instructions that may perform any or all of the operations involved in the private network tracking device AR view services herein. The disclosure of computer instructions that include, for example, the private network tracking device AR view app 800 and the private network tracking device AR view system 600 instructions is not meant to be limiting in any way. Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. Accordingly, the loan funding notification app 500, for example, may be written using any number of programming languages and/or executed on compatible platforms including, but not limited to, JavaScript, PHP (PHP: Hypertext Preprocessor), WordPress, Drupal, Laravel, React.js, Angular.js, and Vue.js. Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (e.g., using an Internet Service Provider), or the connection may be made to external computers.

Figure 9:
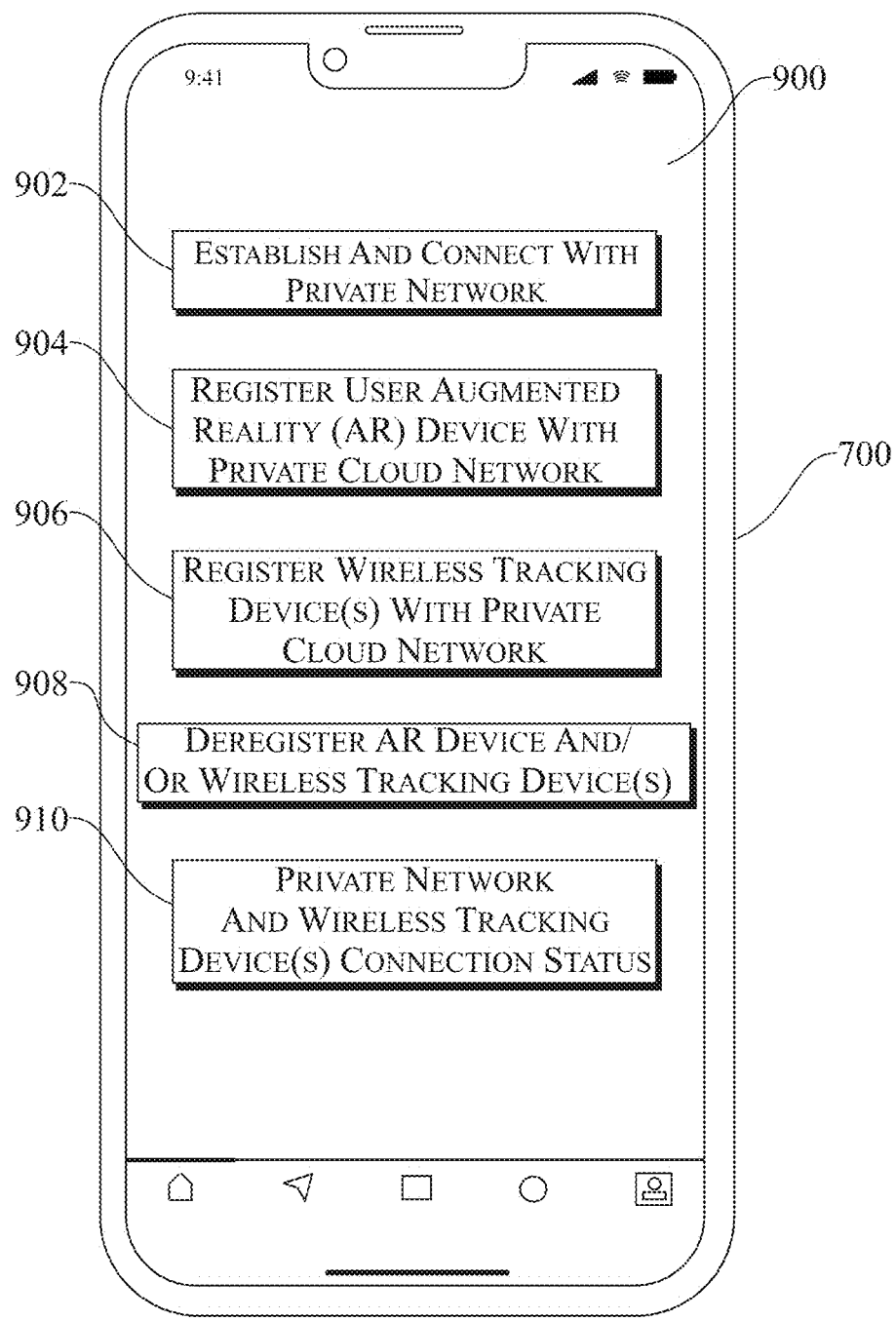
FIG. 9 presents illustrative graphical user device interface in accordance with an embodiment.

Turning our attention to FIG. 9, an illustrative graphical user device interface 900 is shown in accordance with an embodiment. More particularly, FIG. 9 shows an exemplary user screen configured in accordance with the graphical user interface 900 (illustratively, a mobile user/application interface, as displayed by and through the user device 700, to the user (e.g., the user 110-1)). As shown, the user is able to select various icons in order to execute any or all of the aforementioned operations. For example, the following icons may be used: icon 902 to establish and connect with a private network (e.g., the private network 130), icon 904 to register the user AR device (e.g., the AR device 118) with the private network, icon 906 to register the wireless tracking device(s) (e.g. the WTDs 202, 204, 206, 208, 210 and/or 212), icon 908 to deregister any AR device and/or WTD, and icon 910 to monitor the private network and the WTDs connection status at any particular time.

Figure 10:
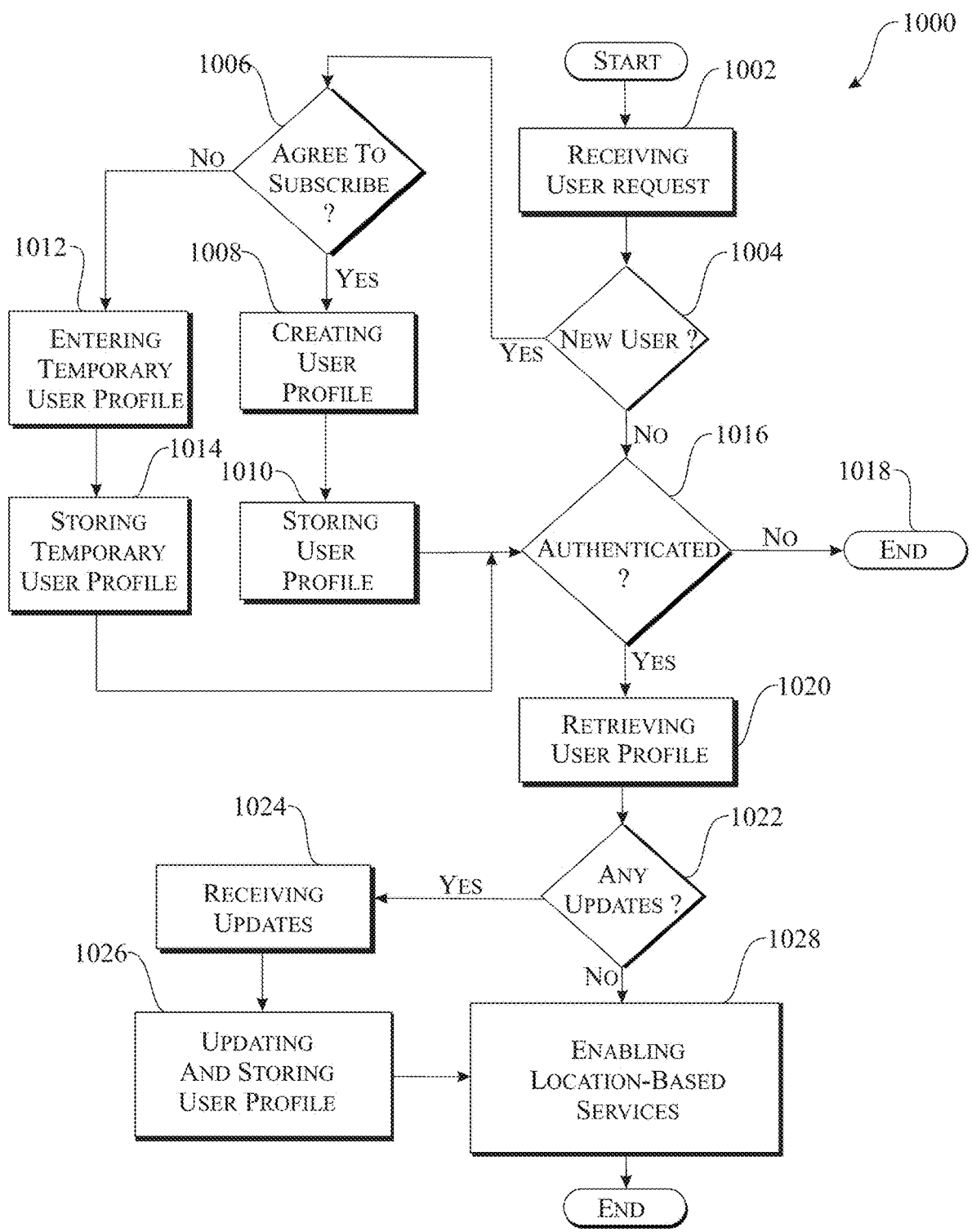
FIG. 10 presents a flowchart of illustrative operations for user onboarding in accordance with an embodiment.

Turning our attention to FIG. 10, a flowchart of illustrative operations 1000 is shown for user onboarding and subscription in accordance with an embodiment. As noted above, the disclosed embodiments herein contemplate a subscription-based service for use by the users but may also be used in a no-fee or non-subscribed platform basis. As such, at step 1002, receiving a user request (e.g., the user 110-1). At step 1004, determining if a user is a new or returning user and, if a new user, then at step 1006 determining whether the user is a subscriber or not (e.g., in accordance with a user agreement and/or user privacy/ security agreement). If so, then the new user is subscribed and, at step 1008, a user profile is created and the user profile is stored, at step 1010. In accordance with the principles of the embodiments hereunder, the user profile may comprise, among other information, at least the user's name, home address, social security number or other unique identifier, a user ID, electronic mail address, payment information, and other associated information. If the user declines to become a subscriber, then they may proceed as a non-subscriber and will be entering, at step 1012, a temporary user profile and storing the user profile at step 1014. Illustratively, such temporary user profile may be an abbreviated version of the aforementioned subscriber's user profile. If the user is a returning user (or one of the newly subscribed users or non-subscribed users), their identity is authenticated, at step 1016 (e.g., using the aforementioned user ID). In an embodiment, two-factor authentication is used to verify the user's credentials (e.g., a text message to the user device 700 associated with this user). If not authenticated, then the operations end at step 1018, and if they are authenticated then, at step 1020, their respective user profile is retrieved. A determination is made, at step 1022, as to whether any updates to the user profile are desired and if so, then at step 1024, receiving the update, and updating and storing the user profile, at step 1026. If no updates are necessary (or after the updating operations are completed), at step 1028, there is an enablement of location-based services (e.g., on the user device 700 associated with the user, for example, the user 110-1) to facilitate the location-based services operations detailed herein.

Figure 11:
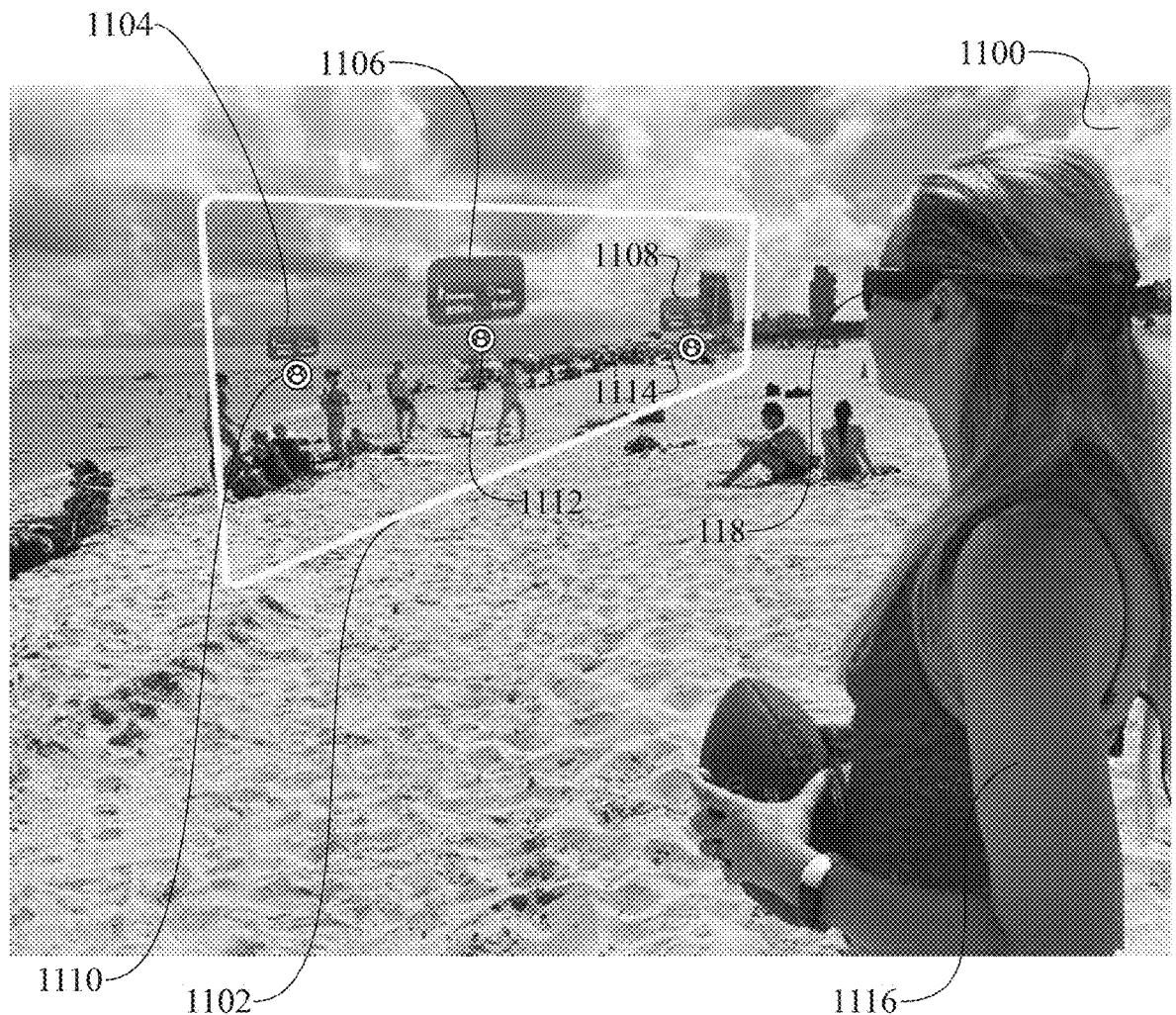
FIGS. 11, 12, and 13 present various private network visual augmented reality views as created hereunder in accordance with an embodiment.
Figure 12:
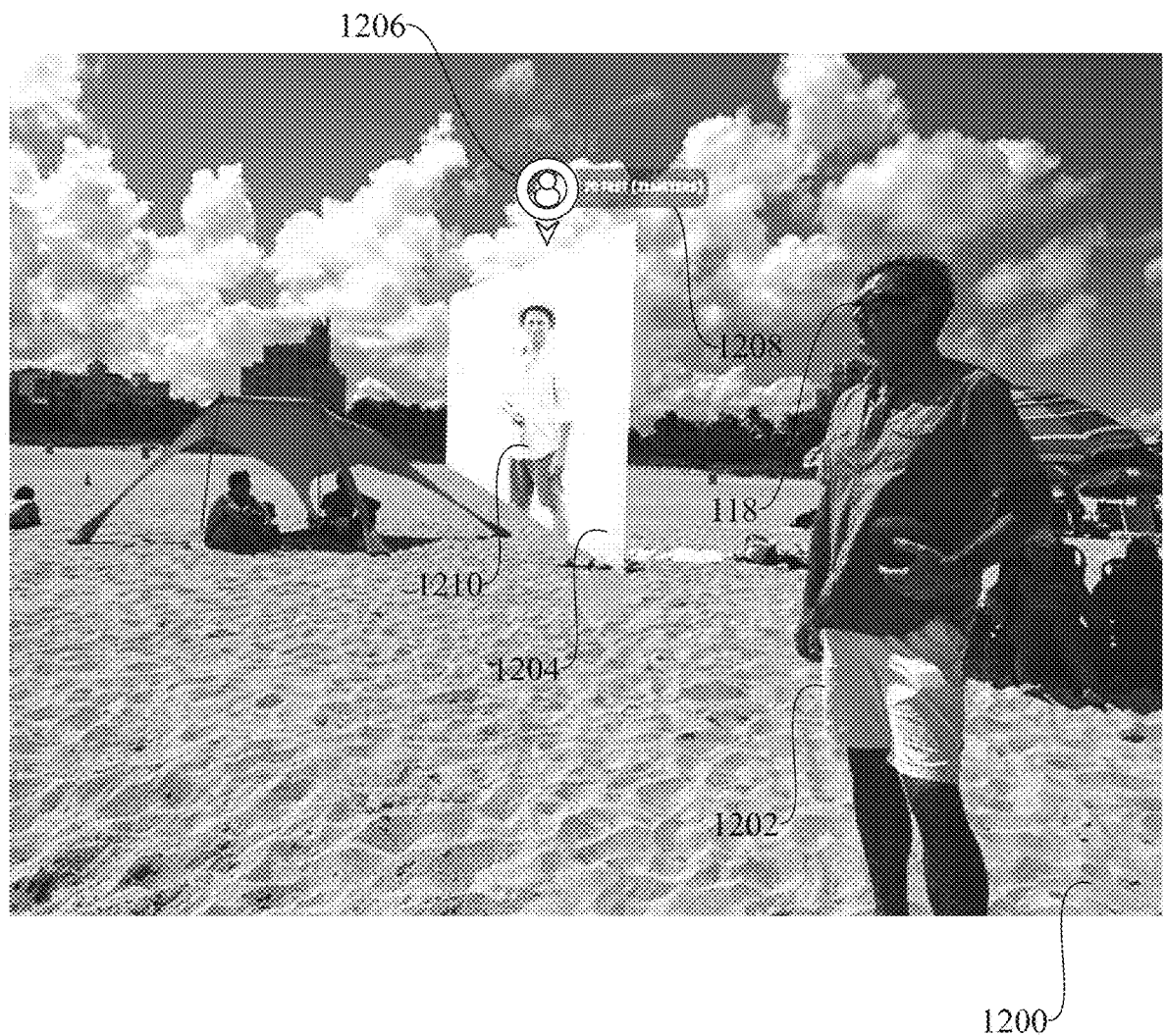
Figure 13:
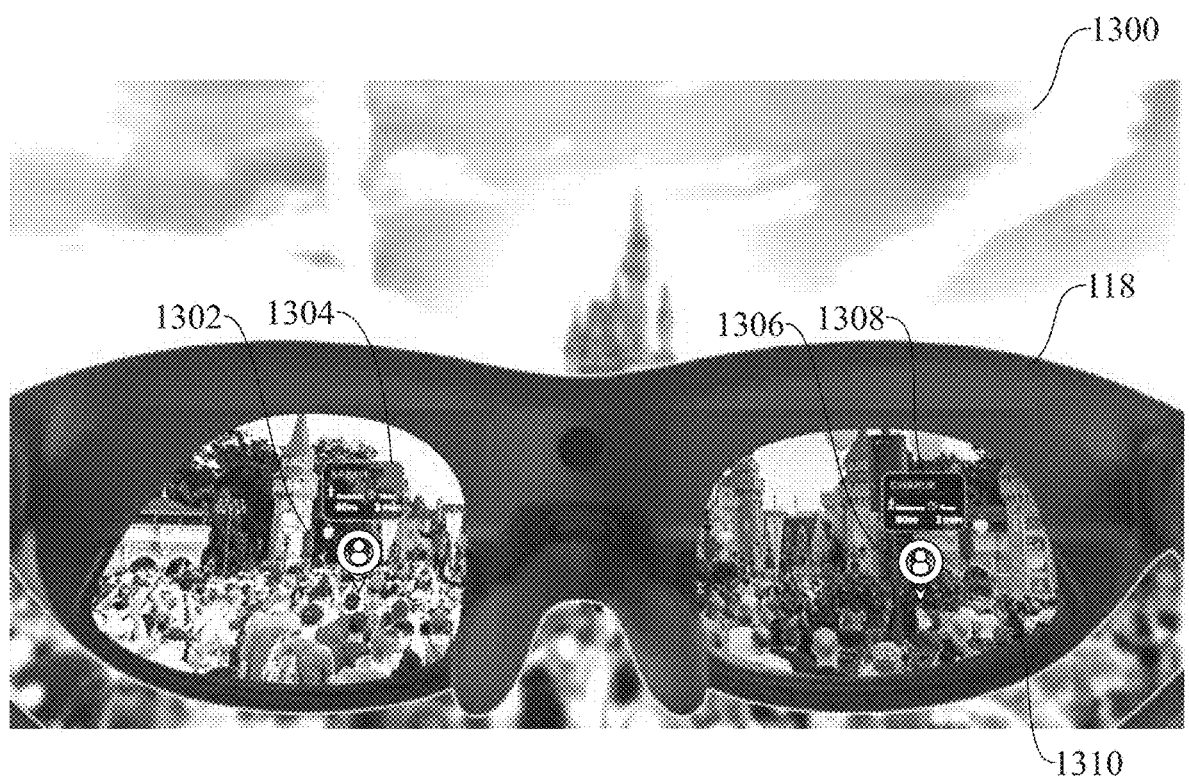

Turning our attention to FIGS. 11, 12, and 13 various private network visual augmented reality views are shown as created hereunder in accordance with an embodiment. More particularly, FIG. 11 shows user 1116 wearing their respective AR device 118 for rendering exemplary private network visual AR view 1102. In accordance with the principles of the disclosed embodiments, multiple WTDs have been registered with a private network (e.g., the private network 130) and are represented using a different one tracking symbol (i.e., symbol 1110, symbol 1112, and symbol 1114) of a plurality of tracking symbols used for designating the present location tracked of the particular ones of the registered plurality of wireless tracking devices. The private network visual AR view 1102 further shows the available location information 1104 associated with the symbol 1110, location information 1106 associated with symbol 1112, and location information 1108 associated with symbol 1114 that each represent a particular one subject that the user 1116 is interested in tracking (e.g., while everyone is enjoying beach area 1100). In similar fashion, FIG. 12 shows user 1202 wearing their respective AR device 118 for rendering exemplary private network visual AR view 1204. In accordance with the principles of the disclosed embodiments, the respective WTD is registered with the private network and is represented using a tracking symbol 1206 for designating the present location tracked (e.g., in area 1200). The private network visual AR view 1204 further shows the available location information 1208 associated with the tracking symbol 1206 along with a visual of a person 1210 being tracked by the user 1202. FIG. 13 shows private network visual AR view 1310 as rendered using the AR device 118. The private network visual AR view 1310 (associated with area 1300) further comprises tracking symbol 1302 associated with location information 1304 (as associated with a respective registered WTD) and tracking symbol 1306 associated with location information 1308 (as associated with another one respective registered WTD) in accordance with the principles of the disclosed embodiments.

Advantageously, as detailed herein, the private network tracking device AR view system and method disclosed herein facilitates registering wireless tracking device(s) with a private network for generating a private network visual augmented reality view that includes a rendering of the registered wireless tracking device(s) current location therein. In this way, a user (or subscriber) may choose which individuals they want tracked (e.g., their loved ones), and then allow them to see the real-time location of this individual. In a preferred embodiment, the individual being tracked is in possession of the wireless tracking device in combination the user wearing an AR device (e.g., pair of AR glasses) which will be used to display at least a location pin floating in the area above each tracked individual (e.g., in the sky). Illustratively, the exclusive AR view displayed includes the distance to the individual being tracked, and the pin will moderate (e.g., grow in size and/or change color) as the user gets closer to the individual being tracked. Further, in the event the user does not have the AR device in their possession, the user may also see the tracked individual on the screen of their user device (e.g., a smartphone) in a rendered type of AR view. In an embodiment, the user may employ and define geofences around certain areas, so that the user gets an alert if the tracked individual enters the predefined area. In an embodiment, the tracked individual will be able to alert the user that they are in distress and require assistance by deploying a button or icon on their user device (e.g., a smartphone) which triggers a signal transmission to the user's AR device and/or another user device.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention. A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. "Software" may refer to prescribed rules to operate a computer. Examples of software may include code segments in one or more computer-readable languages; graphical and or/textual instructions; applets; pre-compiled code; interpreted code; compiled code; and computer programs. A network is a collection of links and nodes (e.g., multiple computers and/or other devices connected together) arranged so that information may be passed from one part of the network to another over multiple links and through various nodes. Examples of networks include the Internet, the public switched telephone network, wireless communications networks, computer networks (e.g., an intranet, an extranet, a local-area network, or a wide-area network), wired networks, and wireless networks.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the func-tions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media. When a single device or article is described herein, it will be readily apparent that more than one device/article (whether or not they cooperate) may be used in place of single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-transitory, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that com-prise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, removable media, flash memory, a "memory stick", any other memory chip or cartridge, a carrier wave as described hereinafter, or any other medium from which a computer can read. Various forms of computer readable media may be involved in carrying sequences of instructions to a processor. For example, sequences of instruction may be delivered from RAM to a processor, may be carried over a wireless transmission medium, and/or may be formatted according to numerous formats, standards or protocols, such as Bluetooth, 4G, 5G, etc.

Where databases are described, it will be understood by one of ordinary skill in the art that alternative database structures to those described may be readily employed, and other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units. A "network" may refer to a number of computers and associated devices that may be connected by communication facilities. A network may involve permanent connections such as cables or temporary connections such as those made through the telephone or other communication links. A network may further include hard-wired connections (e.g., coaxial cable, twisted pair, optical fiber, waveguides, etc.) and/or wireless connections (e.g., radio frequency waveforms, free space optical waveforms, acoustic waveforms, etc.). Examples of a network may include: an internet, such as the Internet; an intranet; a LAN; a wide area network (WAN); and a combination of networks, such as an internet and an intranet.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method comprising:
registering one or more augmented reality (AR) devices with a private network, each particular one AR device of the one or more AR devices registered associated with and worn by a respective one user of a plurality of users;

registering a plurality of wireless tracking devices with the private network, each wireless tracking device of the plurality of wireless tracking devices configured for tracking a respective one tracking subject of a plurality of tracking subjects;

tracking, through the private network, a present location for particular ones of the plurality of wireless tracking devices registered, the particular ones of the plurality of wireless tracking devices registered being associated with the respective one user of the plurality of users;

generating an exclusive AR view showing at least the present location tracked of the particular ones of the plurality of wireless tracking devices registered;

transmitting, across the private network, the exclusive AR view generated to the particular one AR device associated with and worn by the respective one user, wherein the exclusive AR view generated is exclusive to the respective one user and inaccessible by any other users of the plurality of users;

adjusting a size or a color of the different one symbol of the plurality of tracking symbols;

displaying the exclusive AR view transmitted on the particular one AR device associated with and worn by the respective one user; and wherein the size of the different one symbol of the plurality of tracking symbols is adjusted as a function of a proximity of the present location tracked of the particular ones of the plurality of wireless tracking devices registered to a present location of the particular one AR device registered associated with and worn by the respective one user of the plurality of users, and the color of the different one symbol of the plurality of the tracking symbols is adjusted as a function of a movement towards or away from the present location tracked of the particular ones of the plurality of wireless tracking devices registered to a present location of the particular one AR device registered associated with and worn by the respective one user of the plurality of users.

2. The method of claim 1, wherein the method further comprises:
receiving a specification for a defined boundary area from the respective one user; and
tracking, through the private network, the present location for particular ones of the plurality of wireless tracking devices registered in relation to the defined boundary area.

3. The method of claim 1, wherein the method further comprises:
generating at least one geofence for use in the tracking a present location for particular ones of the plurality of wireless tracking devices registered; and
displaying the at least one geofence generated as part of the exclusive AR view generated and displayed.

4. The method of claim 1, wherein a different one symbol of a plurality of tracking symbols is used for designating the present location tracked of the particular ones of the plurality of wireless tracking devices registered.

5. The method of claim 4, wherein the method further comprises:
displaying a name associated with the respective one tracking subject of at least one of the particular ones of the plurality of wireless tracking devices registered being tracked as part of the exclusive AR view generated and displayed.

6. The method of claim 1, wherein at least one of the wireless tracking devices registered is a personal tracking device or a radio-frequency identification (RFID) tag.

7. The method of claim 1, wherein at least one of the wireless tracking devices registered is a smartphone.

8. The method of claim 1, wherein each one of the wireless tracking devices registered is affixed to or within the respective one tracking subject associated therewith.

9. The method of claim 1, wherein the respective one tracking subject is an object, a person, an animal, a vehicle or a physical asset.

10. The method of claim 1, wherein the private network is a virtual private cloud network.

11. The method of claim 1, wherein the method further comprises:
receiving the exclusive AR view transmitted by the particular one AR device associated with and worn by the respective one user across the private network.

12. The method of claim 1, wherein the method further comprises:
scanning a unique identification code associated with at least one wireless tracking device of the plurality of wireless tracking devices for use in the registering thereof.

13. A method comprising:
registering one or more augmented reality (AR) devices with a private network, each particular one AR device of the one or more AR devices registered associated with and worn by a respective one user of a plurality of users;
registering a plurality of wireless tracking devices with the private network, each wireless tracking device of the plurality of wireless tracking devices configured for tracking a respective one tracking subject of a plurality of tracking subjects, wherein the respective one tracking subject is an object, a person, an animal, or a vehicle;
tracking, through the private network, a present location for particular ones of the plurality of wireless tracking devices registered, the particular ones of the plurality of wireless tracking devices registered being associated with the respective one user of the plurality of users;
generating an exclusive AR view showing at least the present location tracked of the particular ones of the plurality of wireless tracking devices registered, wherein a different one symbol of a plurality of tracking symbols is used for designating the present location tracked of the particular ones of the plurality of wireless tracking devices registered;
transmitting, across the private network, the exclusive AR view generated to the particular one AR device associated with and worn by the respective one user, wherein the exclusive AR view generated is exclusive to the respective one user and inaccessible by any other users of the plurality of users;
displaying the exclusive AR view transmitted on the particular one AR device associated with and worn by the respective one user; and
adjusting a size or a color of the different one symbol of the plurality of tracking symbols, wherein the size of the different one symbol of the plurality of tracking symbols is adjusted as a function of a proximity of the present location tracked of the particular ones of the plurality of wireless tracking devices registered to a present location of the particular one AR device registered associated with and worn by the respective one user of the plurality of users, and the color of the different one symbol of the plurality of the tracking symbols is adjusted as a function of a movement towards or away from the present location tracked of the particular ones of the plurality of wireless tracking devices registered to a present location of the particular one AR device registered associated with and worn by the respective one user of the plurality of users.

14. The method of claim 13, wherein the method further comprises:
receiving a specification for a defined boundary area from the respective one user; and
tracking, through the private network, the present location for particular ones of the plurality of wireless tracking devices registered in relation to the defined boundary area.

15. The method of claim 13, wherein the method further comprises:
displaying a name associated with the respective one tracking subject of at least one of the particular ones of the plurality of wireless tracking devices registered being tracked as part of the exclusive AR view generated and displayed.

16. A method comprising:
registering one or more augmented reality (AR) devices with a private network, each particular one AR device of the one or more AR devices registered associated with and worn by a respective one user of a plurality of users;
registering a plurality of wireless tracking devices with the private network, each wireless tracking device of the plurality of wireless tracking devices configured for tracking a respective one tracking subject of a plurality of tracking subjects, wherein the respective one tracking subject is an object, a person, an animal, or a vehicle, wherein each one of the wireless tracking devices registered is affixed to or within the respective one tracking subject associated therewith;
tracking, through the private network, a present location for particular ones of the plurality of wireless tracking devices registered, the particular ones of the plurality of wireless tracking devices registered being associated with the respective one user of the plurality of users;
generating an exclusive AR view showing at least the present location tracked of the particular ones of the plurality of wireless tracking devices registered, wherein a different one symbol of a plurality of tracking symbols is used for designating the present location tracked of the particular ones of the plurality of wireless tracking devices registered, and adjusting a size or a color of the different one symbol of the plurality of tracking symbols, wherein the size of the different one symbol of the plurality of tracking symbols is adjusted as a function of a proximity of the present location tracked of the particular ones of the plurality of wireless tracking devices registered to a present location of the particular one AR device registered associated with and worn by the respective one user of the plurality of users, and the color of the different one symbol of the plurality of the tracking symbols is adjusted as a function of a movement towards or away from the present location tracked of the particular ones of the plurality of wireless tracking devices registered to a present location of the particular one AR device registered associated with and worn by the respective one user of the plurality of users;
transmitting, across the private network, the exclusive AR view generated to the particular one AR device associated with and worn by the respective one user, wherein the exclusive AR view generated is exclusive to the respective one user and inaccessible by any other users of the plurality of users;
receiving by the particular one AR device associated with and worn by the respective one user across the private network the exclusive AR view transmitted; and
displaying the exclusive AR view received on the particular one AR device associated with and worn by the respective one user.

17. The method of claim 16, wherein the method further comprises:
generating at least one geofence for use in the tracking a present location for particular ones of the plurality of wireless tracking devices registered; and
displaying the at least one geofence generated as part of the exclusive AR view generated and displayed.

* * * * *